(12) United States Patent
Graef et al.

(10) Patent No.: US 7,556,259 B2
(45) Date of Patent: Jul. 7, 2009

(54) CASH DISPENSING AUTOMATED BANKING MACHINE WITH NOTE UNSTACKING AND VALIDATION

(75) Inventors: H. Thomas Graef, Bolivar, OH (US); Zachary Utz, North Canton, OH (US); Daniel P. Schoeffler, Twinsburg, OH (US); Shawn Griggy, North Canton, OH (US); Natarajan Ramachandran, Uniontown, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 113 days.

(21) Appl. No.: 11/800,535

(22) Filed: May 7, 2007

(65) Prior Publication Data

US 2007/0216081 A1 Sep. 20, 2007

Related U.S. Application Data

(60) Division of application No. 11/410,347, filed on Apr. 24, 2006, which is a division of application No. 10/821,144, filed on Apr. 7, 2004, now Pat. No. 7,140,607, and a continuation-in-part of application No. 10/688,670, filed on Oct. 17, 2003, now Pat. No. 7,261,236, said application No. 10/821,144 and a continuation-in-part of application No. 10/688,725, filed on Oct. 17, 2003, now Pat. No. 7,322,481.

(60) Provisional application No. 60/535,366, filed on Jan. 9, 2004, provisional application No. 60/535,359, filed on Jan. 9, 2004, provisional application No. 60/419,681, filed on Oct. 18, 2002, provisional application No. 60/435,153, filed on Dec. 19, 2002, provisional application No. 60/419,681, filed on Oct. 18, 2002, provisional application No. 60/435,153, filed on Dec. 19, 2002.

(51) Int. Cl.
*B65H 3/52* (2006.01)
(52) U.S. Cl. .................. 271/122; 271/124; 271/262
(58) Field of Classification Search .................. 271/122, 271/124, 125, 262, 263
See application file for complete search history.

(56) References Cited

U.S. PATENT DOCUMENTS

| 4,159,782 A | 7/1979 | Swartzendruber |
| 4,494,747 A | 1/1985 | Graef et al. |
| 4,552,350 A | 11/1985 | Nagy et al. |

(Continued)

*Primary Examiner*—David H Bollinger
(74) *Attorney, Agent, or Firm*—Ralph E. Jocke; Daniel D. Wasil; Walker & Jocke

(57) ABSTRACT

An automated banking machine (10) includes a cash dispenser (220). A machine user interface (15) includes a card reader (16), receipt printer opening (30), and cash dispensing opening (38). A cash acceptor mechanism (80) includes a chute (82) which enables a user to input a stack of currency notes (84) into the machine through a deposit opening (40). Notes are separated from an inputted stack via a note picker device (158, 352) and a note stripper device (64, 162, 354). Upon sensing multiple notes have been picked, picker device movement is reversed to function with the stripper device in returning notes toward the stack. The stripper device is driven to move a note engaged therewith at a faster rate or for a longer time period relative to a note engaged with the picker device to reorient returning notes to facilitate a subsequent note separation attempt.

20 Claims, 27 Drawing Sheets

U.S. PATENT DOCUMENTS

| | | |
|---|---|---|
| 4,822,018 A | 4/1989 | Hain |
| 4,936,564 A | 6/1990 | Hain |
| 4,993,587 A | 2/1991 | Abe |
| 5,129,642 A * | 7/1992 | Svyatsky et al. ......... 271/10.03 |
| 5,141,127 A | 8/1992 | Graef et al. |
| 5,267,826 A | 12/1993 | Peters |
| 6,109,522 A | 8/2000 | Force et al. |
| 6,264,102 B1 | 7/2001 | Haney et al. |
| 6,302,393 B1 | 10/2001 | Beskitt et al. |
| 6,315,194 B1 | 11/2001 | Graef et al. |
| 6,331,000 B1 | 12/2001 | Beskitt et al. |
| 6,783,061 B2 | 8/2004 | Graef et al. |
| 7,140,607 B2 | 11/2006 | Graef et al. |
| 7,261,236 B2 * | 8/2007 | Utz et al. .................... 235/379 |
| 7,322,481 B2 * | 1/2008 | Utz et al. .................... 209/534 |
| 2002/0043756 A1 * | 4/2002 | Swinton et al. ............. 271/121 |
| 2003/0046232 A1 | 3/2003 | Peters et al. |
| 2003/0089769 A1 | 5/2003 | Jantsch |
| 2003/0107165 A1 * | 6/2003 | Werner et al. ............... 271/121 |
| 2003/0201318 A1 | 10/2003 | Graef et al. |

* cited by examiner

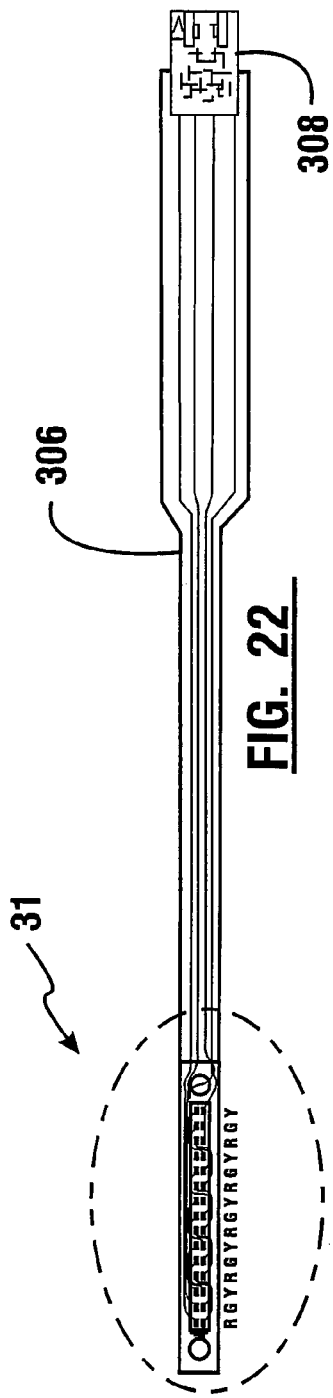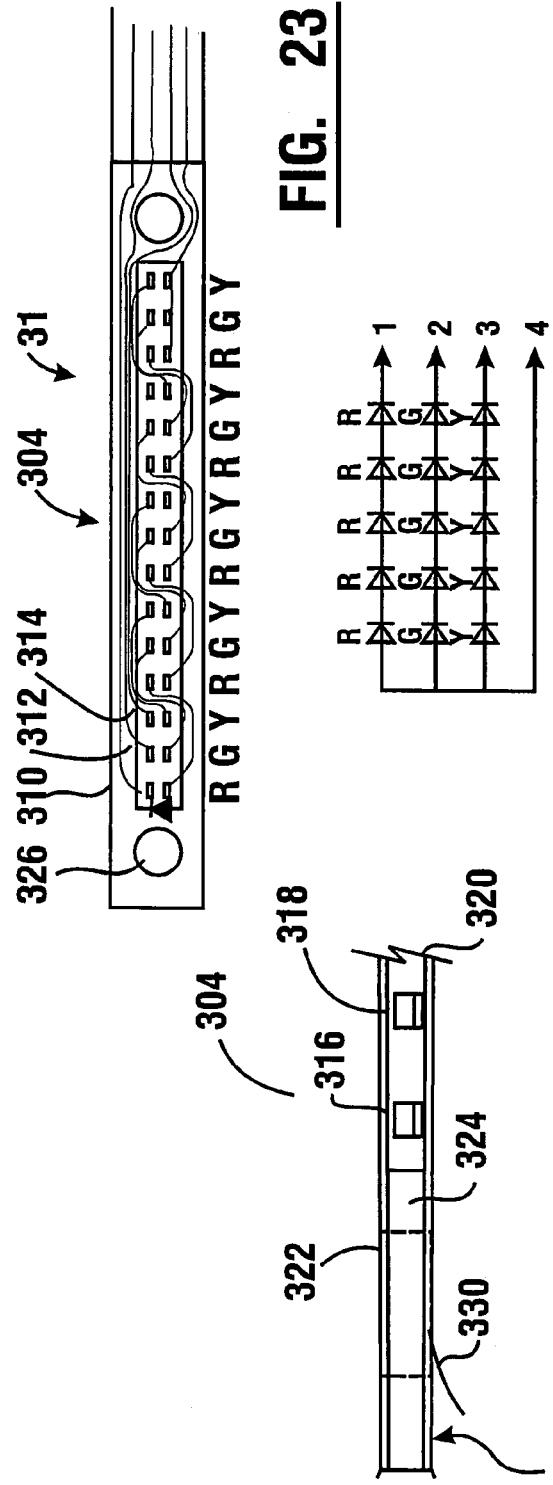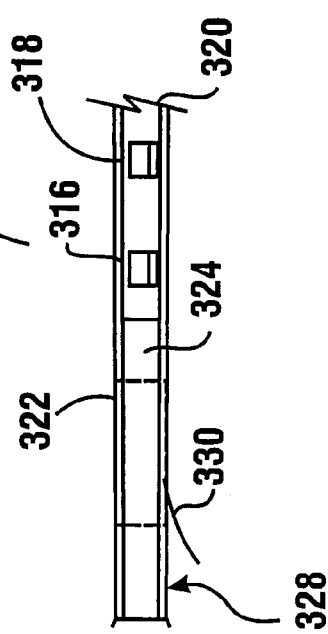

CASH DISPENSING AUTOMATED BANKING MACHINE WITH NOTE UNSTACKING AND VALIDATION

CROSS REFERENCE TO RELATED APPLICATIONS

This application is a divisional of U.S. application Ser. No. 11/410,347 filed Apr. 24, 2006, which is a divisional of U.S. application Ser. No. 10/821,144 filed Apr. 7, 2004, which claims benefit pursuant to 35 U.S.C. § 119(e) of U.S. Provisional Application 60/535,366 filed Jan. 9, 2004 and 60/535,359 filed Jan. 9, 2004; U.S. application Ser. No. 10/821,144 is also a continuation-in-part of U.S. application Ser. Nos. 10/688,670 filed Oct. 17, 2003 and 10/688,725 filed Oct. 17, 2003, each of which claims benefit under 35 U.S.C. § 119(e) of U.S. Provisional Application 60/419,681 filed Oct. 18, 2002 and 60/435,153 filed Dec. 19, 2002. The disclosures of each of the foregoing applications are herein incorporated by reference.

TECHNICAL FIELD

This invention relates to automated banking machines. Specifically this invention relates to automated banking machines that have the capability of receiving financial instrument sheets such as notes, checks and other documents from users. This invention also relates to automated banking machines that dispense financial instrument sheets to users of the machines. This invention further relates to improved user interfaces for such automated banking machines.

BACKGROUND ART

The common type of automated banking machine used by consumers is an automated teller machine ("ATM"). ATMs enable customers to carry out banking transactions. Banking transactions carried out using ATMs may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine shall be deemed to include any machine that may be used to carry out transactions involving transfers of value.

Many types of automated banking machines are required to handle financial instrument sheets. Such sheets may include for example, notes, checks or other documents that are representative of value. In some cases the financial instrument sheets may have varying properties from sheet to sheet. For example some sheets may be new and crisp while others that are equally valid may be used and worn. Alternatively, financial instrument sheets may be of different types which have different properties. These may include for example combinations of documents such as notes and checks which may be comprised of different types of paper or plastic materials. Mechanisms which may separate each individual sheet from a stack rapidly and reliably, particularly in situations where the sheets have diverse properties, present challenges.

Automated banking machines are often positioned in locations that are sometimes unattended by bank officials or representatives of other entities owning the machines. In such cases security features are desirable to make it more difficult for criminals to attack the machine and attain access to the valuable financial instrument sheets that may be housed therein.

Some automated banking machines are operated under conditions where they are exposed to the elements. In such situations rain or snow may enter openings in the machine and cause problems. This may be particularly true of sensitive mechanisms within the machine that handle financial instrument sheets.

Automated banking machines are useful because they perform banking functions in a generally rapid and reliable manner. However there are situations where machines must go out of service for preventive maintenance or remedial service. In such cases it is desirable to enable an authorized servicer to complete the maintenance activity as expeditiously as possible. This is desirably done by enabling ready access to the interior of the machine authorized servicers while minimizing the risk of unauthorized access by criminals.

Thus there exists a need for automated banking machines with improved properties related to handling financial instrument sheets, weather resistance, security and service capabilities.

DISCLOSURE OF INVENTION

It is an object of an exemplary embodiment of the present invention to provide an automated banking machine.

It is a further object of an exemplary embodiment of the present invention to provide an automated banking machine that has improved capabilities for handling financial instrument sheets.

It is a further object of an exemplary embodiment of the present invention to provide an automated banking machine which provides enhanced security.

It is a further object of an exemplary embodiment of the present invention to provide an automated banking machine that facilitates user operation.

It is a further object of an exemplary embodiment of the present invention to provide an automated banking machine that has improved weather resistance.

It is a further object of an exemplary embodiment of the present invention to provide an automated banking machine that provides improved service access.

Further objects of exemplary embodiments of the present invention will be made apparent in the following Best Modes for Carrying Out Invention and the appended claims.

Certain of the foregoing objects are accomplished in an exemplary embodiment of the invention by an automated banking machine which is an automated teller machine ("ATM"). The ATM includes a user interface which includes input devices for receiving identifying inputs that identify user accounts, as well as inputs from users that cause the machine to carry out transaction functions. The user interface further includes one or more output devices that output indicia such as instructions for a user in operating the machine.

The exemplary embodiment includes a cash acceptor mechanism that is capable of receiving a stack of documents from a user. In the exemplary embodiment the stack of documents may include a stack of notes of various denominations or a stack comprising mixed types of financial instrument sheets such as notes and checks. In order to identify and process these financial instrument sheets, the exemplary embodiment includes a mechanism which operates to separate each sheet individually from the stack. This is accomplished in the exemplary embodiment through movement of a picking member which includes a plurality of sheet engaging portions which engage a first sheet bounding the stack and urge the sheet to move in a first direction. In the exemplary embodiment the sheet engaging portions are separated by recesses which extend along the first direction. To reduce the risk that any sheets other than the first sheet are separated from the stack, a first stripper portion is generally aligned with at least one recess. The first stripper portion engages the first sheet on a face thereof opposed from the face of the sheet engaged by the sheet engaging portions. This first stripper portion is generally not in a contacting stripping engagement with the picking member, and remains disposed therefrom a sufficient distance to enable the first sheet to pass in intermediate relation between the picking member and the first stripping portion.

In the exemplary embodiment the engagement of the first sheet with the picking member and the first stripper portion is operative to impart a cross-sectional wave configuration to the sheet. Imparting this cross-sectional wave configuration and the forces imparted by the picking member and the first stripper portion generally operate to separate the first sheet bounding the stack from other sheets in the stack.

In the exemplary embodiment a second stripper portion is provided and is engaged by the first sheet as it moves in the first direction after the sheet has been engaged by the first stripper portion. The second stripper portion is generally engaged in contacting stripping engagement with the picking member. The second stripper portion is biased toward the picking member with such force that sheets other than the first sheet moving in the first direction are prevented from moving past the second stripper portion while the first sheet is enabled to pass between the picking member and the second stripper portion. In the exemplary embodiment the relative movement of the picking member in stripping engagement with the second stripper portion is operative in most cases to separate additional sheets from the first sheet that have not been separated by the first stripper portion. For example, financial instrument sheets may have different frictional and rigidity properties from sheet to sheet. For this reason the sheets that are not separated by the action of the picking member and the first stripper portion, will often be separated by the action of the picking member and the second stripper portion.

In the exemplary embodiment the picking member comprises a generally cylindrical member with arcuate high friction segments thereon for engaging the sheet. The high friction segments in the exemplary embodiment are separated by annular recesses. In the exemplary embodiment the first stripper portion includes a surface of a plurality of rollers that are positioned in generally opposed but non-contacting engagement with the annular recesses. The first stripper rollers serve as a non contact stripper and in a first exemplary embodiment are each in operative connection with a one-way clutch which resists movement of the rollers in a rotational direction in which the rollers are urged to move as the first sheet is being separated by the stack. The one-way clutches, however, enable ready movement of the sheet in the opposite direction so as to return a sheet to the stack. This may be done in some embodiments when it is detected that overlapping double sheets have been picked and it is desired to reverse the sheets in an attempt to strip all but a single sheet. In the first exemplary embodiment the second stripper portion serves as a contact stripper and includes a surface of at least one contacting stripper roll that is biased into stripping engagement with a sheet engaging portion of the picking member. The contacting stripper roll of the first exemplary embodiment is similarly in operative connection with a one-way clutch so as to resist movement of the sheet being removed from the stack to provide stripping while enabling movement of the sheet to return to the stack.

In some alternative embodiments, one or both of the stripper members may be driven by one or more drives in coordinated relation with the picking member. In such exemplary embodiments these stripper members may be driven so as to reconfigure sheets to facilitate the separation thereof. For example, in some embodiments sheets may be oriented in the stack such that sheets are relatively disposed to one another in ways that make it more difficult to separate the sheets. For example, if the sheet located at the bottom of the stack is the one to be separated by being moved in a first direction by a picking member, and such bottom sheet is in abutting relation with an overlying sheet that is significantly advanced in the first direction relative to the underlying sheet, difficulty may be encountered in separating the two sheets until they are reoriented such that the overlying sheet is positioned so that it is even with or retarded from the first sheet relative to the picking direction.

This may be accomplished in some embodiments through selectively driving one or more of the stripper members when multiple bills are sensed as having been able to pass the stripping members. In such cases the direction of the picking members and one or more stripping members may be reversed, but with one or both stripping members being driven such that the stripping member moves the overlying sheet further in a direction opposite to the picking direction, than the picking member moves the underlying sheet. This may be done in a number of ways, which may include, for example, having the stripping member or members urge the sheet to move back toward the stack as the sheet bounding the stack is held stationary by the picking member. Alternatively, both the picking member and one or both stripping members may move the multiple overlapping sheets back toward the stack, but with the stripping members moving so as to drive the overlying sheets at a faster rate, and thus a greater distance. Alternatively or in addition, the stripper members may drive the overlying sheet back towards the stack for a longer period of time, thus urging the sheet overlying the bottom sheet which is to be separated a longer distance. Of course, other approaches may be used to move the overlying sheet relative to the sheet to be picked so as to facilitate sheet separation when the picking member again urges the sheet bounding the stack to move in the picking direction. It should be understood, however, that these arrangements are exemplary and in other embodiments other approaches may be used.

The exemplary embodiment of the ATM further includes a housing. The housing includes a fascia which includes elements of the user interface and which extends through an exterior wall of a structure. The ATM housing within the structure includes a secure chest portion in a lower part of the housing. In the exemplary embodiment the chest is a generally L-shaped chest in cross section. In the exemplary embodiment the L-shaped chest has a sheet accepting mechanism such as a cash acceptor device positioned in supporting connection with the chest. The cash accepting mechanism is operative to analyze sheets that have been separated from the stack by operation of the picking member and stripper portions, and to direct sheets that are to be stored in the machine into the chest portion through an opening in an upper surface of the chest. In an exemplary embodiment the cash accepting mechanism is movably mounted in supporting connection with the chest so that when a service door of the housing is opened, the cash acceptor mechanism may be moved rearward for purposes of servicing.

In the exemplary embodiment because the cash accepting mechanism is positioned outside the secure chest and may be moved to expose the opening, provisions are made for minimizing the risk that criminals may access the financial instrument sheets in the chest through the cash accepting opening. This is accomplished in the exemplary embodiment by providing a transport which moves financial instrument sheets transported into the chest from the cash acceptor, in a direction transverse to the cash accepting opening in the chest. After moving transversely relative to the cash accepting opening, the sheets are then transported to a note storage mechanism that may be comprised of storage compartments or other mechanisms for handling the sheets. In an exemplary embodiment a security plate is provided in intermediate relation between the transport which moves the sheets transversely from the opening of the chest, and the note storage mechanism. The security plate reduces the ability of a criminal to access stored sheets through the cash accepting opening. Further, in the exemplary embodiment the driving force for the transport is provided by engagement of a driving member of the cash acceptor mechanism with a driven member through the cash accepting opening. The presence of these members within the opening further obstructs the opening and reduces the risk that a criminal will be able to access stored financial instrument sheets.

In the exemplary embodiment the cash accepting mechanism is provided with a chute for receiving stacks of documents from the user. In the operative position of the cash acceptor mechanism the opening to the chute is controlled by a gate. However, as can be appreciated, it is necessary for the machine to open the gate to enable a user to place or remove sheets from the chute. In some circumstances rain, snow and moisture may enter the chute when the gate is open. The presence of rain, snow or moisture in the chute may interfere with the proper operation of the machine. To minimize this risk in the exemplary embodiment, a water capturing opening is provided in a lower surface of the interior of the chute. The water capturing opening is operative to capture moisture that may enter the chute and the collected moisture is routed in an exemplary embodiment to a drain to that is in fluid communication with the outside of the machine housing. In the exemplary embodiment the drain is provided through a lower surface of the fascia. Also in the exemplary embodiment because the cash acceptor mechanism is movable, a resilient gasket is provided in generally surrounding relation with the chute and interiorly of the fascia. In the operative position of the cash acceptor mechanism the resilient gasket provides a generally fluid tight seal such that water, snow or other elements are not enabled to migrate into the interior of the housing through the opening in the fascia through which the chute extends in its operative position.

In the exemplary embodiment the cash acceptor mechanism is operative to store unacceptable sheets such as suspected counterfeit notes in a suspect note storage area outside the secure chest. In the exemplary embodiment authorized servicers who have access to the area of the housing outside the secure chest are enabled to remove these unacceptable sheets. A readily accessible closure device is provided to facilitate the removal of these suspect sheets by authorized persons. Further, in some embodiments locking mechanisms may be provided not only for the housing area outside the secure chest, but also a separate locking mechanism for the particular compartment in which the unacceptable sheets are stored. This assures that the unacceptable sheets are only accessed by authorized persons while still assuring that other authorized persons can access appropriate machine components without accessing the stored unacceptable sheets.

In the exemplary embodiment the cash acceptor mechanism further includes closure panels which generally surround the components within the mechanism. These closure panels when in the operative position reduce the risk of migration of dirt or other contaminants into the mechanism they also reduce the risk of inadvertent damage to the mechanism when other components are being serviced. In the exemplary embodiment these closure panels are made readily openable through hinged or sliding arrangements that enable the panels to be opened when the mechanism is in a servicing position. In exemplary embodiments an approach is used for mounting closure panels to facilitate gaining access to the components of the cash accepting module, while assuring that the panels will be replaced upon completion of any repair activity. This assures that the benefits provided by the closure panels are not inadvertently lost due to the failure to reinstall such panels after the completion of the servicing activity.

In some exemplary embodiments currency sheets accepted by the cash acceptor mechanism are stored in selected compartments. This enables storing of each type of sheet in a particular compartment. In some embodiments mechanisms are provided for re-dispensing such sheets from the compartment so as to enable recycling of valid sheets. In alternative embodiments sheets that have been validated by the cash accepting mechanism are stored in one or more storage containers. In some exemplary embodiments the storage containers include an interior area which is bounded at the lower end by a moveable shaker member. The shaker member supports deposited sheets in the interior area. An actuator is in operative connection with the shaker member so as to impart shaking action to the deposited items within the interior of the container. This facilitates the dispersal and settling of the items so as to facilitate storing the maximum number of items in the container. In some exemplary embodiments the container is removable from the machine. In some further exemplary embodiments the container includes rollable supports and a retractable handle so as to facilitate moving the container out of and away from the machine when it has been filled with deposit items. Although the exemplary embodiment is described with regard to storing sheets, the principles may be applied to the storage of other items such as tickets and deposit envelopes.

In some exemplary embodiments of the machine the user interface includes multicolor light emitting devices so as to facilitate a user's operation of the machine. In some exemplary embodiments the light emitting devices are selectively controlled by at least one controller in the machine to emit light of a selected color responsive to conditions of associated transaction function devices. For example, the controller may operate to guide a user to a location on the user interface where the user is required to perform some activity related to a transaction. In some exemplary embodiments the light emitting devices selectively emit green, yellow and red and may be operated to indicate a status or condition of a particular device. Alternatively, light emitting devices may flash the same or different colors at varying rates so as to convey information or facilitate use of the machine.

In some exemplary embodiments the user interface of the machine is provided with horizontally disposed convex mirrors positioned vertically above the user interface. Such mirrors are positioned so as to facilitate the ability of a user of the machine to view an area behind and otherwise near the user. This reduces the risk of persons in proximity to the user not being observed by the user carrying out transactions at the machine. The exemplary horizontally disposed convex mirrors are further positioned outward relative to a light which illuminates the user interface to facilitate the user's operation. This reduces the risk of glare and facilitates the user's ability to view the area observable in the mirrors. In some exemplary embodiments provision may be made to sense a need for cleaning of one or more mirrors and to provide built in cleaning mechanisms.

Further novel aspects of the exemplary embodiments will be made apparent in the following detailed description. It should be understood that the features described are exemplary and in other embodiments other approaches may be used which nonetheless employ the features and relationships claimed herein.

BRIEF DESCRIPTION OF DRAWINGS

FIG. 22 is a schematic view of a light emitting device which is operated to facilitate use of the machine by users.

FIG. 23 is an enlarged view of the light emitting device shown in FIG. 22.

FIG. 24 is a schematic view of the light emitting diodes included in the light emitting device.

FIG. 25 is a cross-sectional view of the flexible web which includes the diodes in the light emitting device.

BEST MODES FOR CARRYING OUT INVENTION

Figure 1:
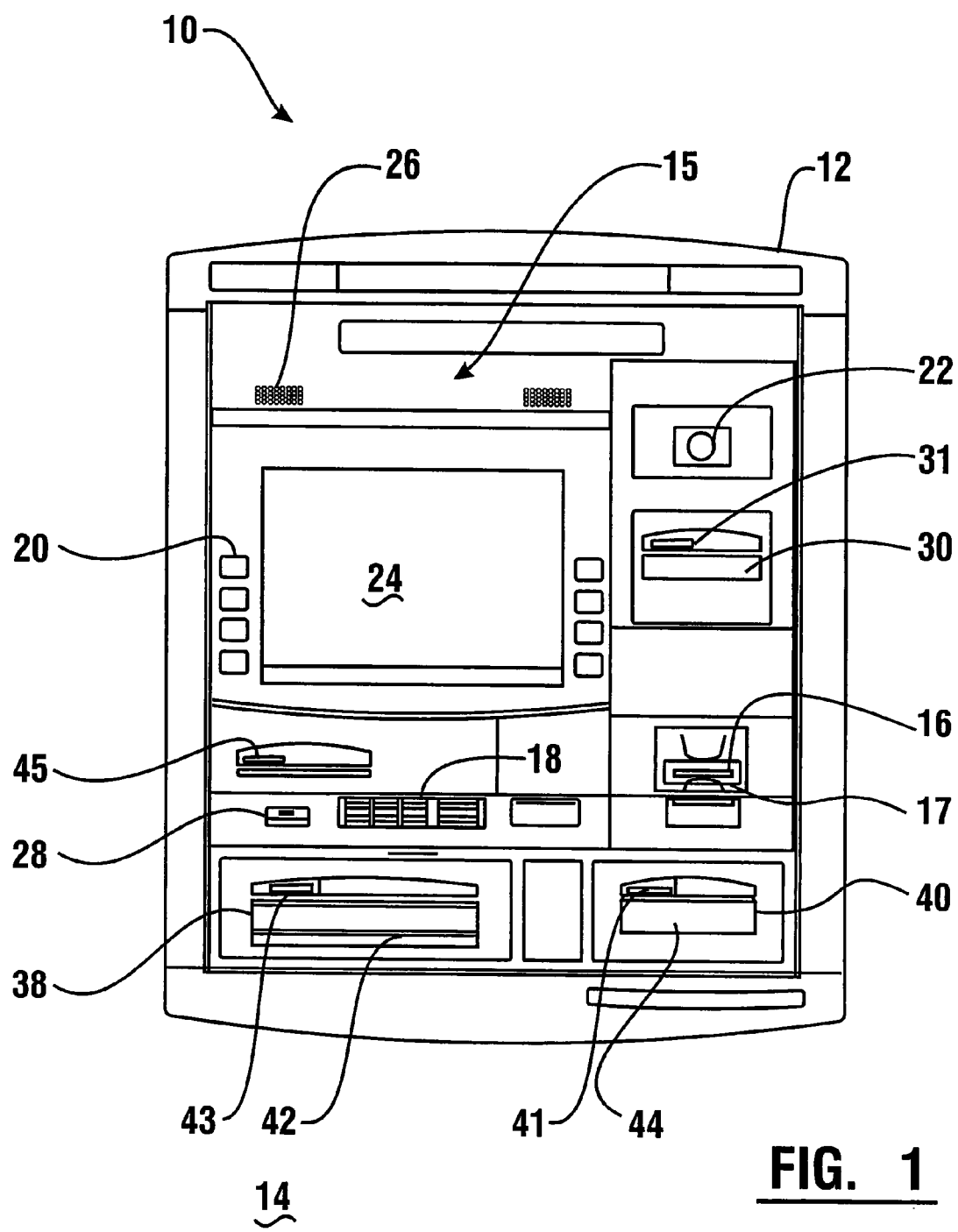
FIG. 1 is a front plan view of an ATM fascia of an automated banking machine of an exemplary embodiment.

Referring now to the drawings and particularly to FIG. 1, there is shown therein a front plan view of an automated banking machine which in the exemplary embodiment is an automated teller machine ("ATM") 10. ATM 10 is a through-the-wall type machine which includes a fascia 12. Fascia 12 is accessible to users of the machine who are positioned externally of the wall 14. In some embodiments wall 14 may be an exterior building wall and ATM 10 may be used in a walk-up or drive-up environment. In other embodiments the ATM may be used in an indoor environment. Of course this configuration is exemplary and in other embodiments, other types of ATM configurations may be used.

The exemplary ATM includes a user interface generally indicated 15. The user interface of the exemplary embodiment includes input devices for receiving inputs from users. These input devices include a card reader 16, a keypad 18, function keys 20 and an imaging device 22. In the exemplary embodiment the input devices may be used for providing identifying inputs such as indicia read from cards, numerical data or biometric data which may be used to identify a particular user of the machine and/or their accounts. In addition the exemplary input devices are also operative to receive transaction inputs which cause the ATM to carry out selected transaction functions. It should be understood that these input devices are exemplary and in other embodiments other types of input devices may be used. The exemplary user interface 15 further includes output devices. The output devices of the exemplary embodiment include a display 24, a speaker 26 and a headphone jack 28. The output devices of the exemplary embodiment are operative to output indicia either visual, audible or both, which are usable to operate the ATM. Of course the output devices shown in user interface 15 are exemplary and in other embodiments other or additional output devices may be used.

The exemplary ATM 10 further includes other transaction function devices. These transaction function devices include a receipt printer 30 which is operative to provide receipts to users of the machine. As shown in more detail in the interior view of the machine shown in FIG. 2, the receipt printer includes a paper supply 32 which supplies paper on which receipts are printed by a printer mechanism 34. Printed receipts are then transported to the receipt opening in the fascia 12 by a transport 36. In exemplary embodiments the receipt printer used may be of the type shown in U.S. Pat. No. 5,850,075, the disclosure of which is incorporated herein by reference. Of course in other embodiments other types of receipt printers may be used.

The exemplary ATM 10 includes on the fascia as shown in FIG. 1, a cash dispensing opening 38 and a cash accepting opening 40. Each of these openings is in operative connection with corresponding transaction function devices as later discussed, and each has an associated gate mechanism which operates to block access through the opening except at appropriate times during transactions by authorized users. In the exemplary embodiment the cash dispensing opening is shown controlled by a gate 42 and the cash accepting opening is controlled by a gate 44. It should be understood that the fascia and devices associated with ATM 10 are exemplary and in other embodiments other or different fascia configurations and devices may be used.

In the exemplary embodiment the user interface of the machine includes a plurality of multicolor light emitting devices 17, 31, 41, 43 and 45. Each of the light emitting devices is positioned at a location adjacent to the location on the user interface which is associated with a particular transaction function device. For example, light emitting device 17 is positioned adjacent to the opening to card reader 16. Likewise, light emitting device 31 is positioned adjacent to the slot for delivery of receipts. Likewise, light emitting device 41 is associated with cash-accepting opening 40, and light emitting device 43 is associated with cash-dispensing opening 38. As later explained, in this exemplary embodiment the multicolor light emitting devices are selectively operated to output light of a particular color responsive to conditions of the associated transaction function device. Such features may be used to guide a user in operation of the machine, provide indications concerning the status of devices, alert a user to particular conditions, or provide improved aesthetics for the machine.

Figure 2:
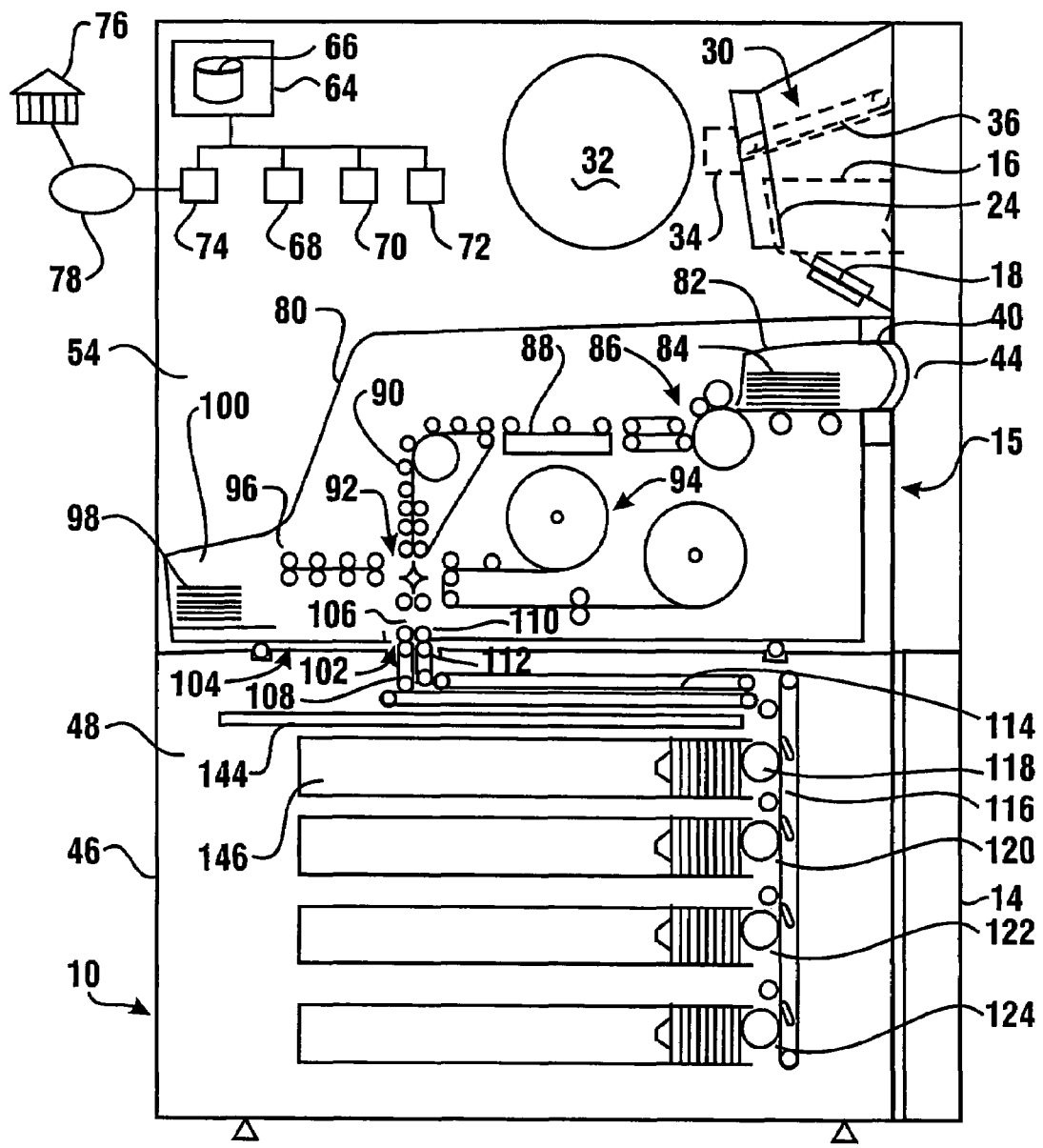
FIG. 2 is a schematic side view of components within a housing of the ATM shown in FIG. 1.
Figure 3:
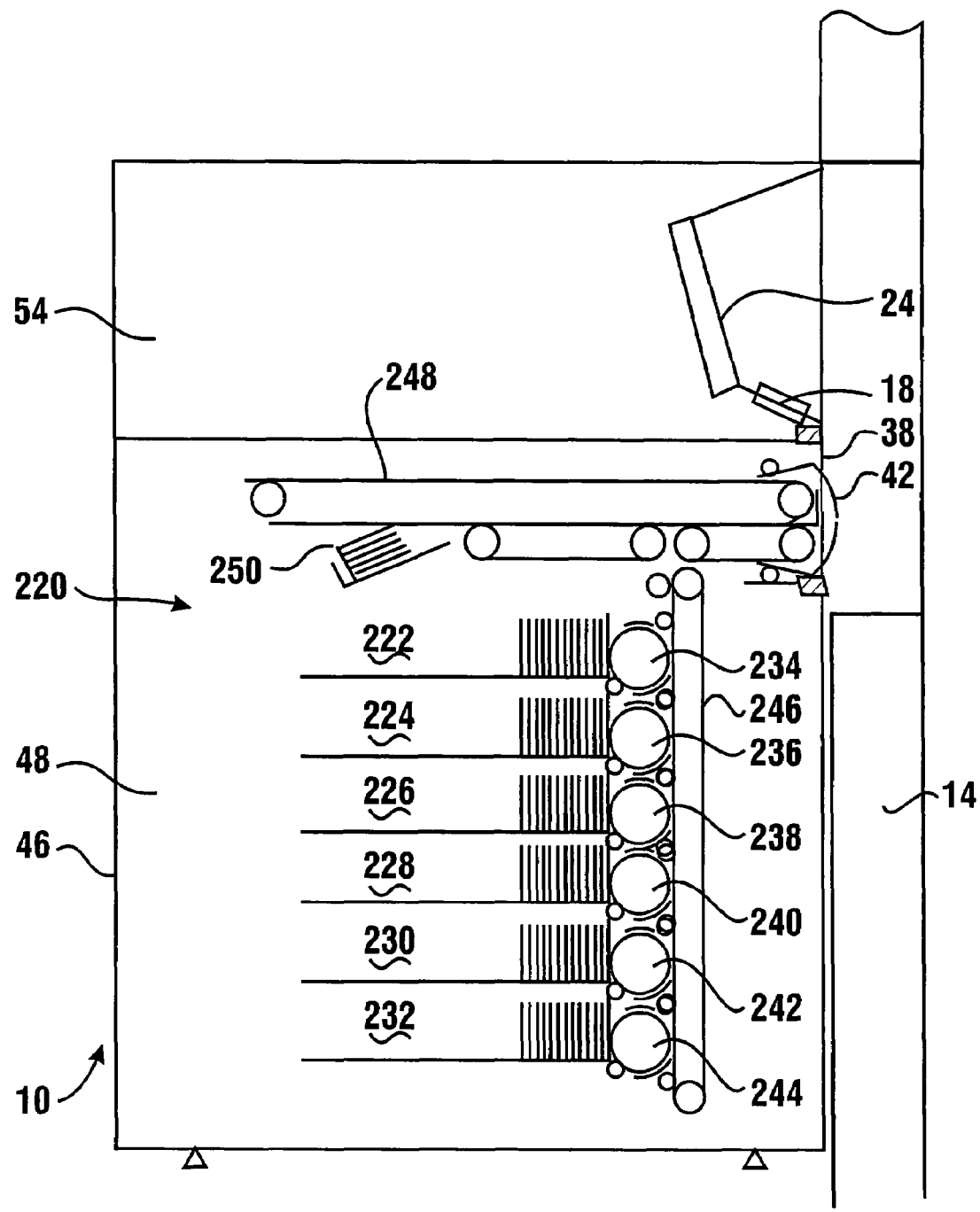
FIG. 3 is a further schematic side view of components within the housing of the ATM shown in FIG. 1.
Figure 6:
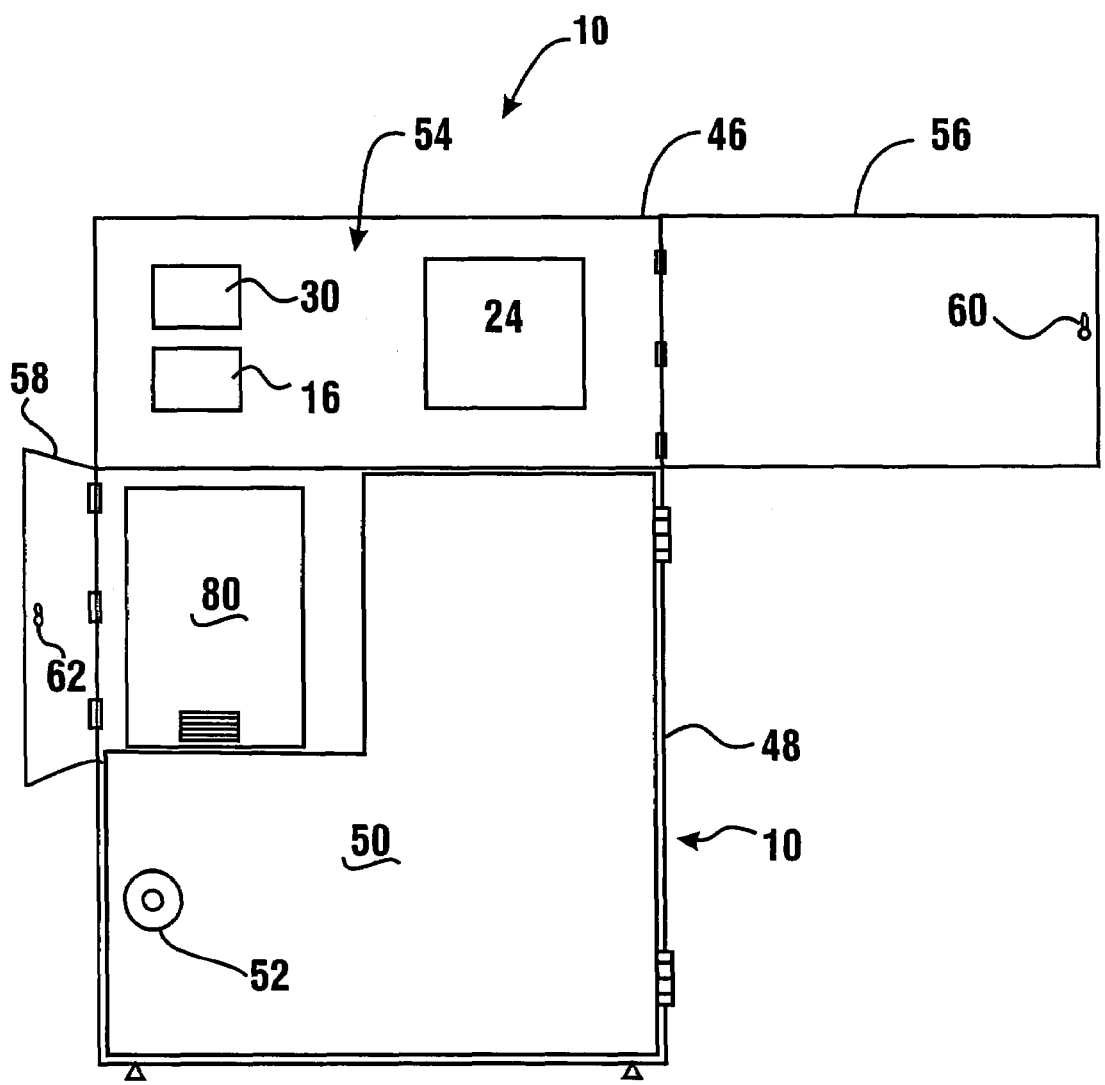
FIG. 6 is a rear view of the housing of the ATM of the exemplary embodiment.
Figure 7:
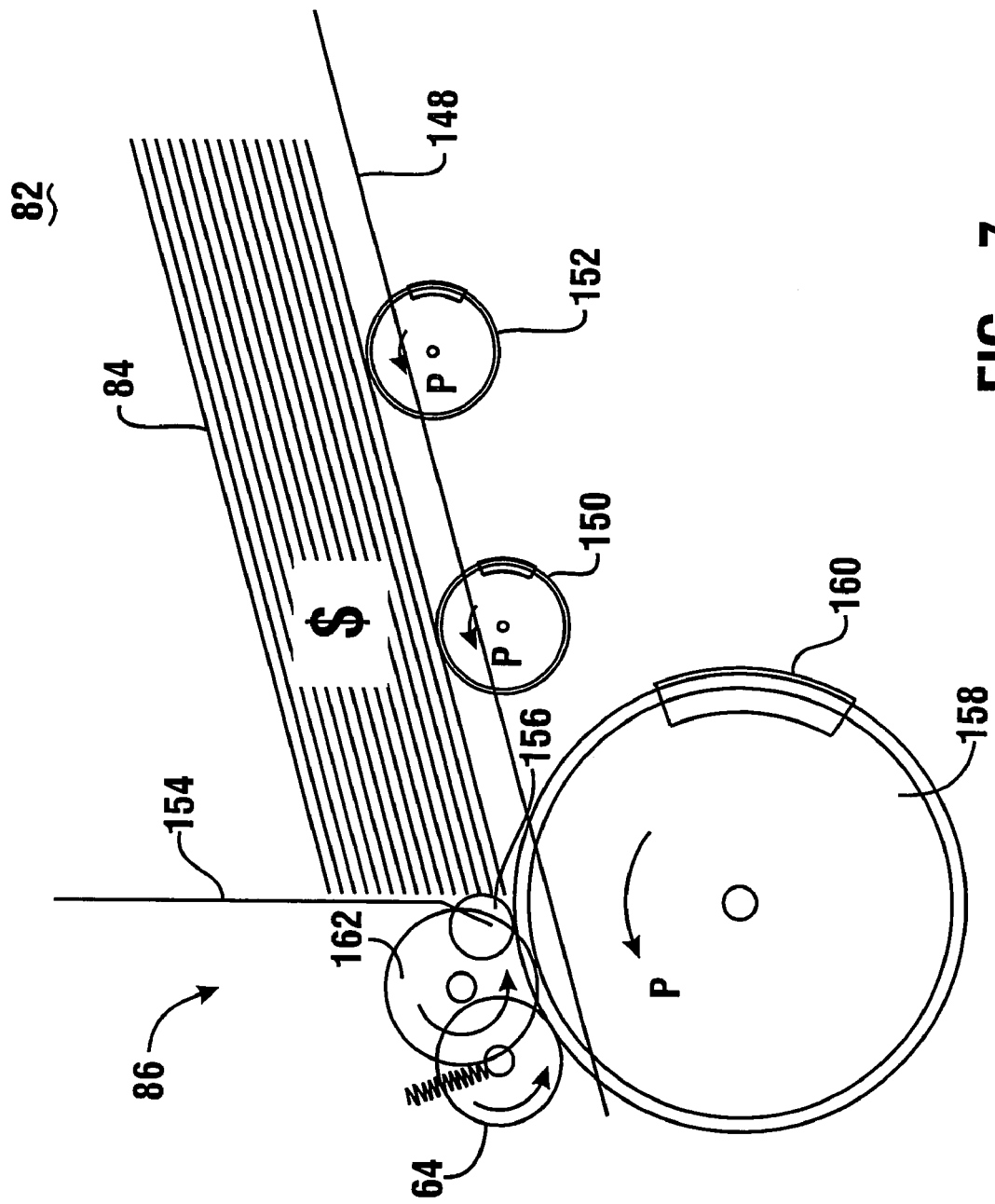
FIG. 7 is a schematic view of an exemplary embodiment of a mechanism for separating sheets from a stack of financial instrument sheets placed within the ATM.

As shown in FIGS. 2, 3 and 6, ATM 10 includes a housing 46 which extends generally on an interior side of wall 14. Housing 46 includes a chest portion 48. In the exemplary embodiment chest portion 48 is a generally secure chest which has a safe-like access door 50. Access to the interior of the chest portion is limited to authorized personnel through a suitable locking mechanism schematically indicated 52 (see FIG. 3). In the exemplary embodiment the chest is generally L-shaped in cross section.

Housing 46 further includes an upper portion 54. Upper housing portion 54 which is in connection with the fascia, is in supporting connection with the chest portion 48. In the exemplary embodiment upper housing portion 54 has in association therewith, access doors 56 and 58. Access to the upper housing portion is controlled by one or more locking mechanisms in operative connection with access doors 56 and 58 as represented by key locks 60 and 62. In the exemplary embodiment the secure chest portion 48 is used to house financial instrument sheets such as currency notes, checks and other valuable sheets. The upper housing portion 54 is generally used to house components of the machine that do not hold on an extended basis notes or other financial instrument documents which can be redeemed for value. Of course it should be understood that the construction of ATM 10 is exemplary and in other embodiments other approaches may be used.

As schematically shown in FIG. 2, ATM 10 includes at least one controller schematically indicated 64. In the exemplary embodiment controller 64 includes at least one processor and is in operative connection with at least one data store schematically indicated 66. In the exemplary embodiment the data store is operative to hold data representative of instructions such as computer programs, configuration parameters, data about transactions conducted and other information that may be usable in the operation of the ATM 10. Computer executable instructions executed by the one or more controllers may be resident on and/or loaded from articles suitable for holding such computer executable instructions. Such articles may include hard disk drives, floppy disks, CD ROMs, PROMs, or other articles from which a computer can read and execute instructions.

Controller 64 is in operative connection with numerous transaction function devices within the ATM, and is operative to control the operation thereof in accordance with its programming. Controller 64 is shown schematically in operative connection with devices 68, 70 and 72. It should be understood that this representation is schematic only and is intended merely to represent numerous components within the machine which are in operative connection with the controller. For example the transaction function devices may include moving devices which may be referred to alternatively herein as drives, such as motors, solenoids and other devices that are operative to impart motion to components. Likewise transaction function devices may include sensors such as radiation sensors, proximity sensors, switches and other types of sensors that are operative to sense items, users, conditions, properties, characteristics or components within the ATM and to enable a controller to perform functions in accordance with its programming. Transaction function devices include output devices such as sound emitters and light emitting devices. For example and without limitation, transaction function devices may include the card reader, display, keyboard, function keys, printer, cash dispenser, cash acceptor, storage mechanisms and other devices previously discussed as well as other devices within the machine which are operative in response to the controller.

In the exemplary embodiment the controller is also in operative connection with a communications device schematically indicated 74. The communications device is operative to communicate messages electronically between the ATM 10 and other computers in financial transaction processing systems. These may include for example communications with systems operated by banks, credit card networks, automated clearinghouses and other entities. In FIG. 2 the communications device 74 in the ATM 10 is schematically shown as providing communication with a financial institution 76 through a network 78. It should be understood that this communication configuration is exemplary and in other embodiments other communication arrangements may be used. U.S. Pat. No. 6,505,177 also shows an exemplary communication system for an ATM and the disclosure thereof is incorporated herein by reference. Embodiments may include features of U.S. Pat. Nos. 6,705,517; 6,672,505; and/or 6,598,023 the disclosures of each of which are incorporated herein by reference.

As represented in FIGS. 2 and 6, in the operative position of ATM 10 the housing 46 houses a sheet acceptor mechanism 80 which is also referred to herein as a cash acceptor mechanism. In the exemplary embodiment the mechanism 80 is operative to accept sheets from a machine user through the opening 40, to analyze each sheet for at least one property or characteristic, and to route the sheets selectively for storage within the housing of the machine based on the characteristics analyzed. It should be understood that in various embodiments these sheets may include currency notes, checks or other financial instrument sheets. It should further be understood that in exemplary embodiments the financial instrument sheets may be sheets comprised of different types of material such as paper, plastic or combinations thereof. It should further be understood that references herein to a cash acceptor mechanism shall be deemed to encompass mechanisms which handle not only currency notes, but also other financial instrument sheets such as checks, money orders, gift certificates, vouchers, etc.

As represented in FIG. 2, cash acceptor mechanism 80 includes a chute 82 which extends through opening 40 in fascia 15 in its operative condition. As previously discussed the user accessible opening to chute 82 is controlled by a movable gate 44. Gate 44 moves responsive to the controller 64 and enables authorized users to access the chute at appropriate times during transaction sequences.

In operation of the machine users are enabled to insert a stack of financial instrument sheets schematically indicated 84, into the chute. The stack 84 may comprise currency notes, checks or other forms of financial instrument sheets.

In operation of the cash acceptor mechanism sheets are individually separated from the stack by a picker mechanism 86, an exemplary embodiment of which is later discussed in detail. Each picked sheet is transported individually from the picker mechanism past the validator device schematically indicated 88. The validator device 88 of the exemplary embodiment is operative to determine at least one characteristic of each sheet. This may include for example a determination as to whether the sheet is a note or check and if a note, the denomination and whether it is valid. If the document is a check, a determination may be made as to whether the check is genuine as well as the indicia associated with the maker of the check and the amount thereof. For example in some exemplary embodiments the validating device may be of the type shown in U.S. Pat. No. 5,923,415, the disclosure of which is incorporated herein by reference. Alternatively or additionally a validating device having features disclosed in U.S. Pat. No. 6,554,185, the disclosure of which is incorporated herein by reference, may be used. Of course in other embodiments other types of validating devices such as imagers, readers, sensors and combinations thereof may be used. For example, in some embodiments the sheet accepting device may be operative to image instruments such as checks and provide data which can be stored and transmitted as an electronic reproduction of that check. In such circumstances an electronic reproduction of the check may be transmitted to remote locations so as to facilitate review and validation of the check. Alternatively or in addition, the electronic representation of the check may serve as a substitute for the physical paper check which thereafter enables the paper check to be cancelled and subsequently destroyed.

In the exemplary embodiment of the cash acceptor mechanism 80, sheets which have been analyzed through operation of the validator device 88 are moved through a transport 90 to a routing device 92. The routing device is operative responsive to the controller 64 to route sheets selectively to either an escrow device 94 or to a transport 96. Escrow device 94 generally operates to hold sheets in storage on a temporary basis. Such an escrow device may be of the type shown in U.S. Pat. No. 6,371,368, the disclosure of which is incorporated by reference herein. Escrow device 94 may be operative to accept sheets and store them. Thereafter responsive to operation of the controller 64 the escrow device may deliver those sheets to the routing device 92 which directs them along sheet paths in the machine to carry out transactions. Of course it should be understood that the escrow device shown is exemplary and in other embodiments other types of escrow devices may be used.

In the exemplary embodiment transport 96 is used to receive unacceptable sheets which have characteristics that do not satisfy certain parameters set by the machine. These may include for example, notes which have one or more characteristics which suggest that they are counterfeit. In other embodiments such sheets may include checks which have properties which suggest that they are reproductions or forged or otherwise unacceptable. Of course in other embodiments other sheets may be deemed unacceptable. As schematically represented in FIG. 2, sheet acceptor mechanism 80 is operated to cause transport 96 to deposit suspect sheets schematically indicated 98 in a storage area 100. In the exemplary embodiment the suspect sheets are stored within the cash acceptor mechanism and outside of the secure chest so that they may be recovered by servicing personnel in a manner that is later discussed. Of course this approach is exemplary and in other embodiments other approaches may be used.

In the exemplary embodiment the cash acceptor mechanism 80 is operative responsive to signals from the controller 64 to cause financial instrument sheets that are determined to be valid or otherwise acceptable, to be directed through a cash accepting opening 102 that extends in an upper surface 104 of the chest. In the operative position of the cash acceptor mechanism shown in FIG. 2, the transport in the cash acceptor mechanism is aligned with the cash accepting opening and a transport 108 that extends into the secure chest. As schematically represented in FIG. 2, in the operative position of the cash acceptor mechanism 80 at least one driving member 110 of the transport 106 is in operative connection with a driven member 112 of the transport 108. In the exemplary embodiment this enables the cash acceptor mechanism to transmit movement to sheet handling mechanisms within the secure chest and to assure coordinated movement of processed sheets therein. Further in the exemplary embodiment the driving and driven members extend in the cash accepting opening so as to block access therethrough by unauthorized persons as later discussed.

Figure 12:
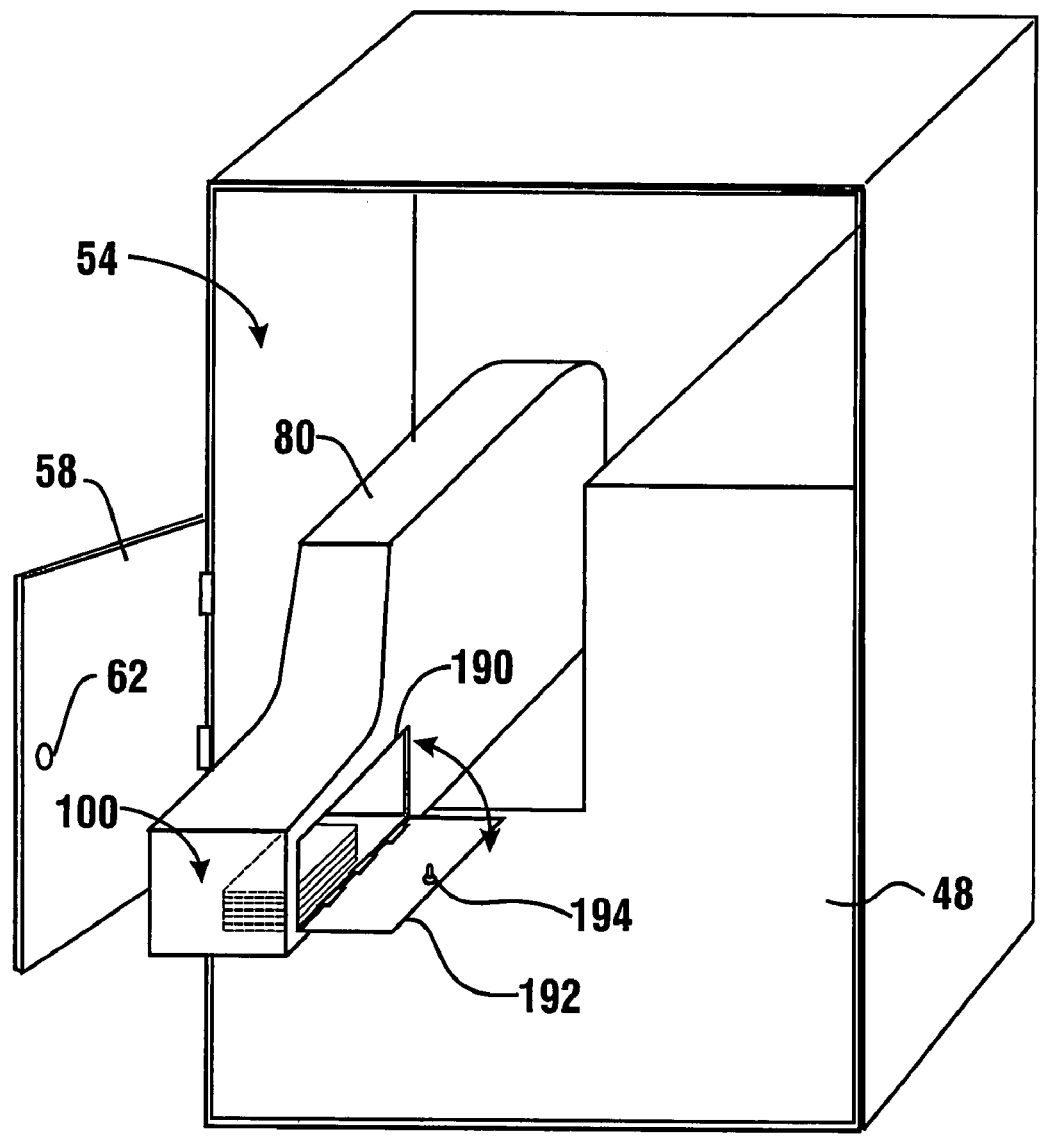
FIG. 12 is a schematic view of the cash acceptor mechanism withdrawn for servicing similar to FIG. 11 and with a first embodiment of an access door in an open position for purposes of accessing unacceptable sheets which have been identified through operation of the cash acceptor mechanism.
Figure 13:
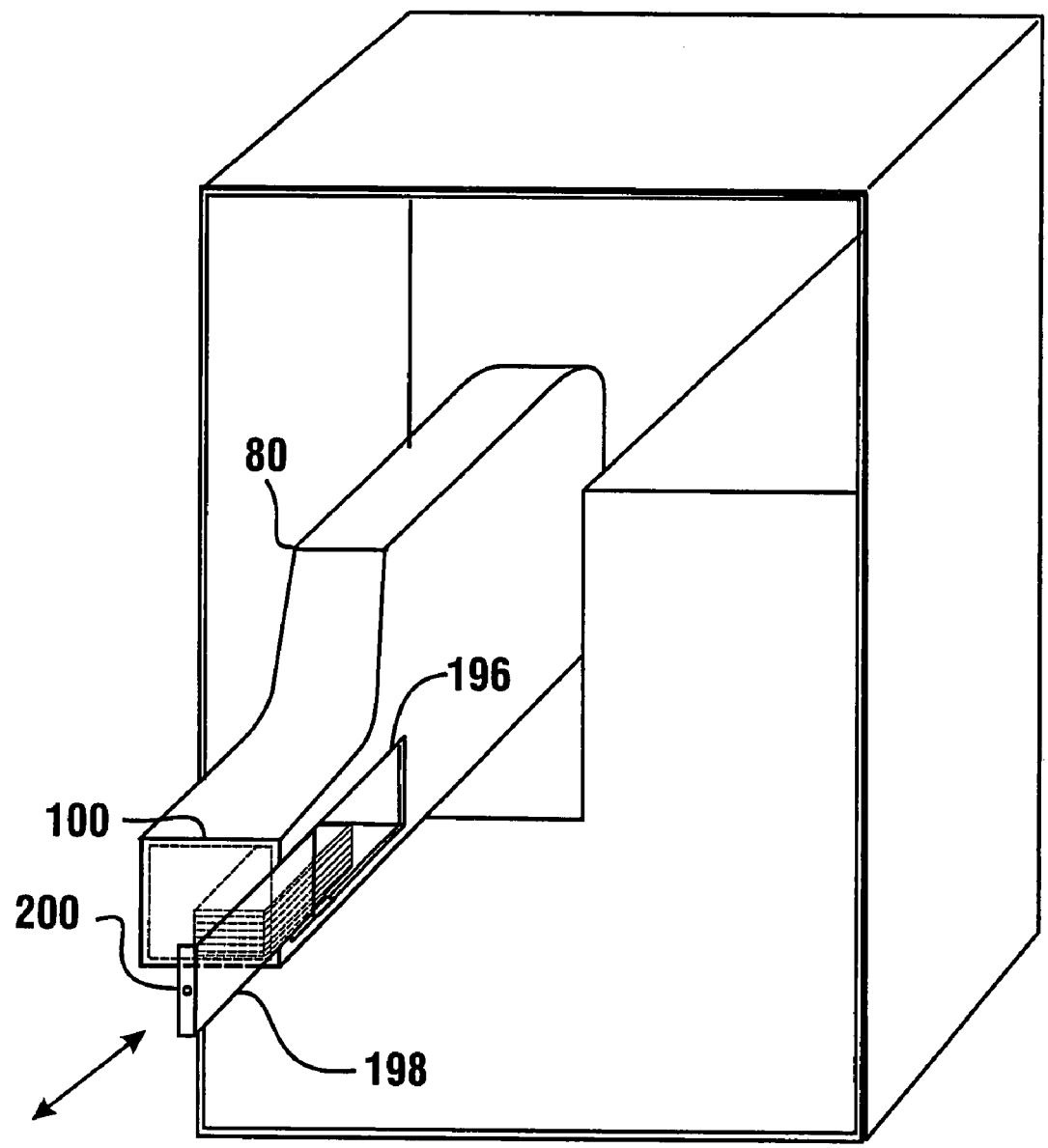
FIG. 13 is a view of the ATM similar to FIG. 12 but with an alternative access mechanism for accessing unacceptable sheets.
Figure 14:
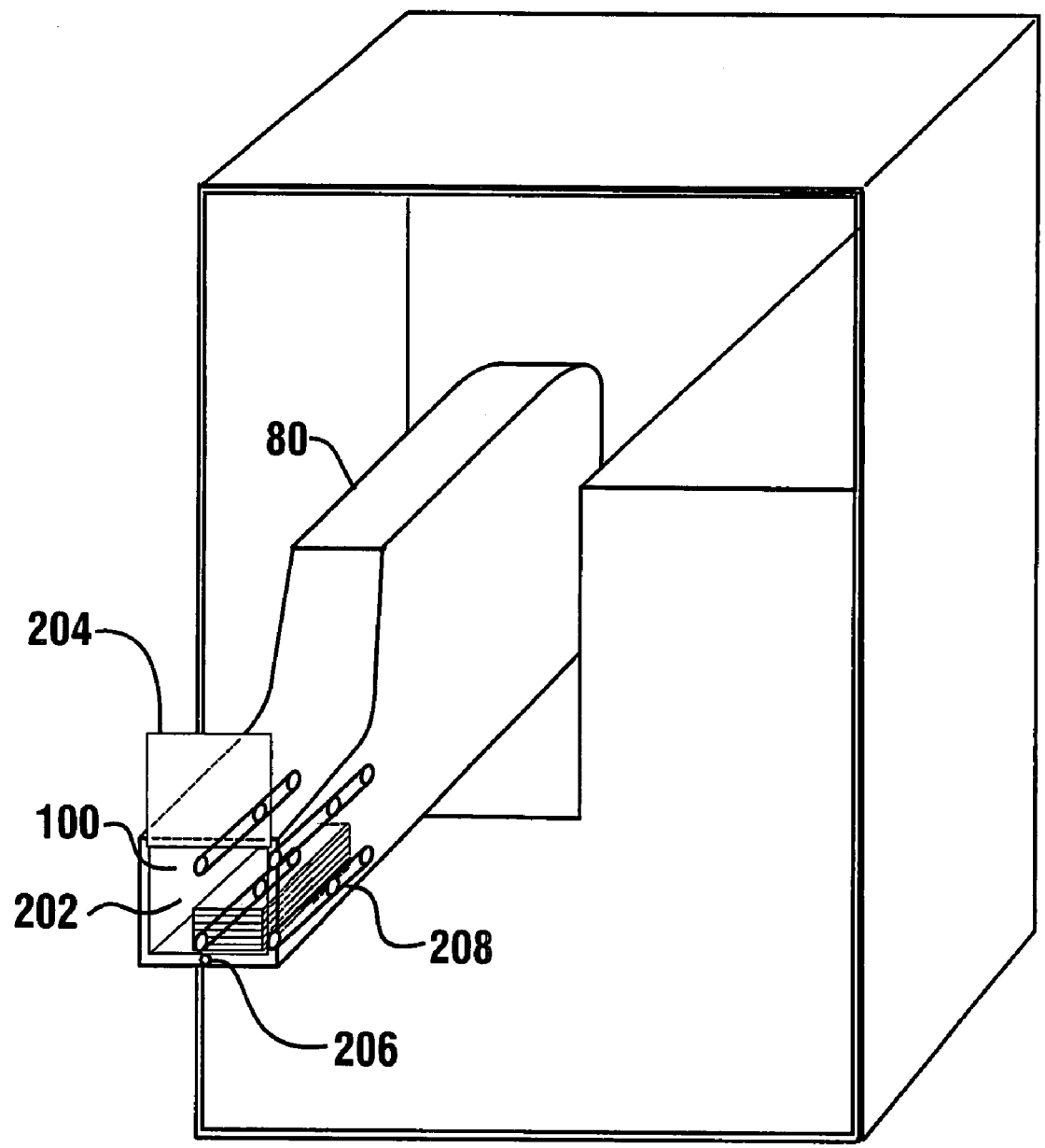
FIG. 14 is yet another view of the ATM similar to FIG. 12 showing a further alternative mechanism for accessing unacceptable sheets.

In the exemplary embodiment when the cash acceptor mechanism is moved from the operative position shown in FIG. 2 to a servicing position such as shown in FIGS. 12, 13 and 14, the driving member 110 and the driven member 112 disengage. In some exemplary embodiments the movement of the cash acceptor mechanism from the operative position to a servicing position may include movably mounting the cash acceptor mechanism such that the mechanism moves both upward away from the secure chest so as to disengage the driving and driven members as well as outward for purposes of servicing. Of course to return the cash acceptor mechanism to the operative position, movement thereof is made both inward and downward so as to reengage the driving and driven members. This may be accomplished by a combination of slides, rollers or other suitable mechanisms. Of course the approach described of providing for engagement between the cash acceptor mechanism and a mechanism for handling sheets within a chest portion is exemplary and in other embodiments other approaches may be used, or the transport within the chest portion may have a separate motor or other moving device.

As shown in FIG. 2, transport 108 which moves sheets generally in a vertical direction through the cash accepting opening is in operative connection with a horizontal transport schematically indicated 114. The horizontal transport is operative to engage sheets moved into the chest portion and to move them transversely away from the cash accepting opening. The horizontally extending transport 114 is in operative connection with a vertically extending transport 116 which is transversely disposed from the cash accepting opening in the secure chest.

Vertical transport 116 is operative to move sheets selectively into engagement with sheet handling mechanisms 118, 120, 122 and 124. In some exemplary embodiments sheet handling mechanisms 118, 120, 122 and 124 may be sheet stacking mechanisms such as those shown schematically in FIGS. 5 and 6. Alternatively or in addition in other embodiments one or more of the sheet handling mechanisms may include sheet receiving and dispensing mechanisms which are operative to selectively accept sheets for storage as well as to dispense sheets therefrom. Examples of sheet accepting and stacking mechanisms as well as sheet accepting, stacking and dispensing mechanisms which may be used in some exemplary embodiments are described in detail in U.S. Pat. Nos. 6,302,393 and 6,290,070, the disclosures of each of which are incorporated by reference.

Figure 4:
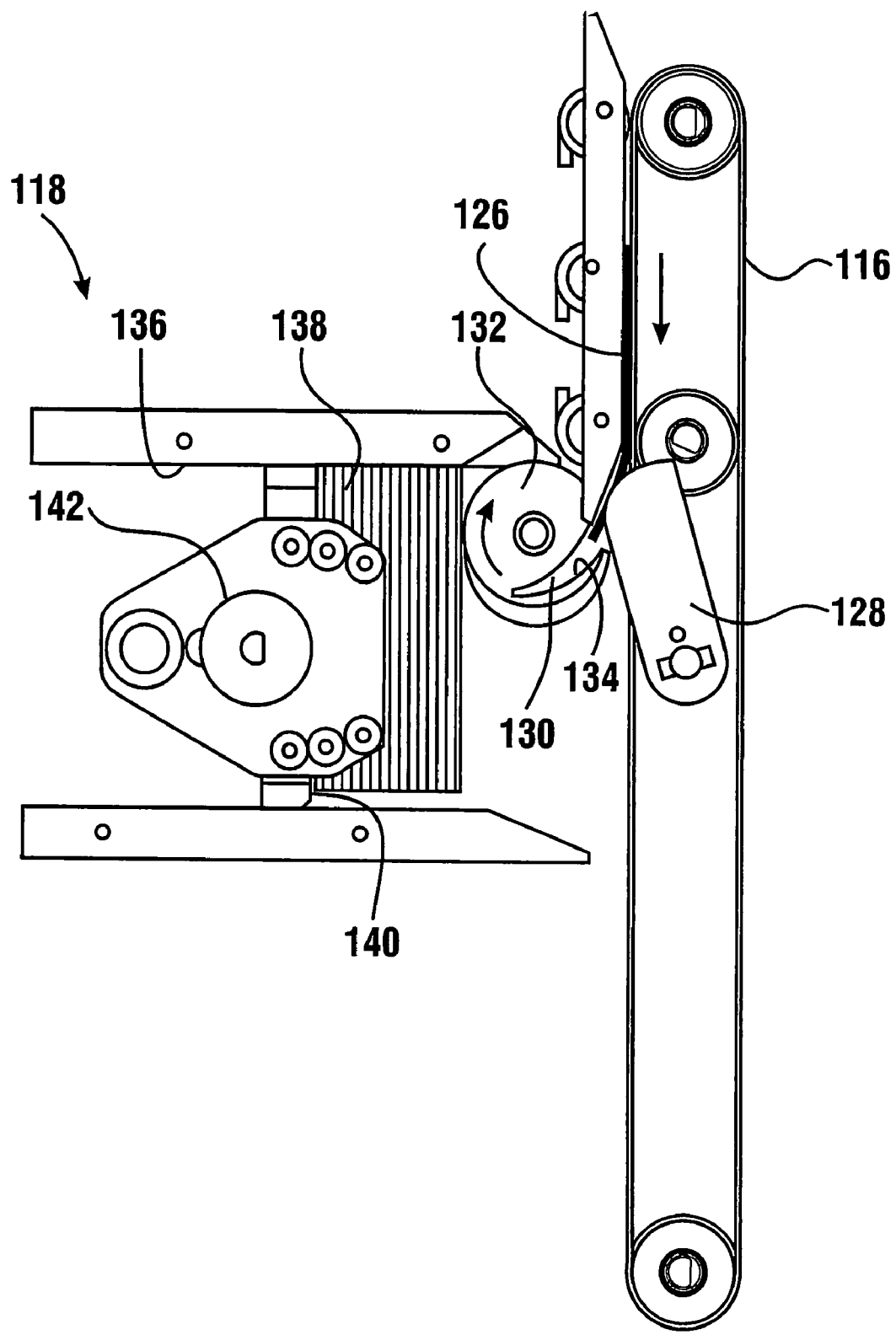
FIG. 4 is a view of a sheet stacking mechanism which may be employed in an exemplary embodiment of the ATM.

As shown schematically in FIG. 4, the exemplary sheet accepting and stacking mechanism 118 is selectively operative to accept a sheet 126 moving in the vertical transport 116. Sheet 126 is guided to engage the sheet handling mechanism 118 through movement of a gate member 128. The gate member moves responsive to the controller 64 to direct the leading edge of the sheet into a recess 130 of a rotatable member 132. As the leading edge of the sheet 126 enters the recess 130 the rotatable member 132 rotates in the direction of Arrow R. This causes the gripper portion bounding the recess 130 to move inwardly capturing the sheet 126 therein. The rotatable member 132 rotates until the leading edge of the sheet 126 engages a stop surface 136 at which time the gripper portion 134 has moved radially outward such that the sheet disengages from the rotatable member 132 and is integrated into a sheet stack 138. Stack 138 may be for example a stack of currency notes all of which are of the same denomination. Of course in other embodiments the stack 138 may be a collection of other types of sheets.

In the exemplary embodiment the stack is maintained in abutting relation with the rotatable member by a biasing plate 140 which acts against the back of the stack. The biasing plate 140 is movable responsive to a biasing mechanism 142 which is operative to enable the stack to increase or decrease while maintaining the sheets in an appropriately aligned position. Further details related to an exemplary embodiment of the sheet handling mechanism are described in the incorporated disclosure of U.S. Pat. No. 6,302,393.

Figure 5:
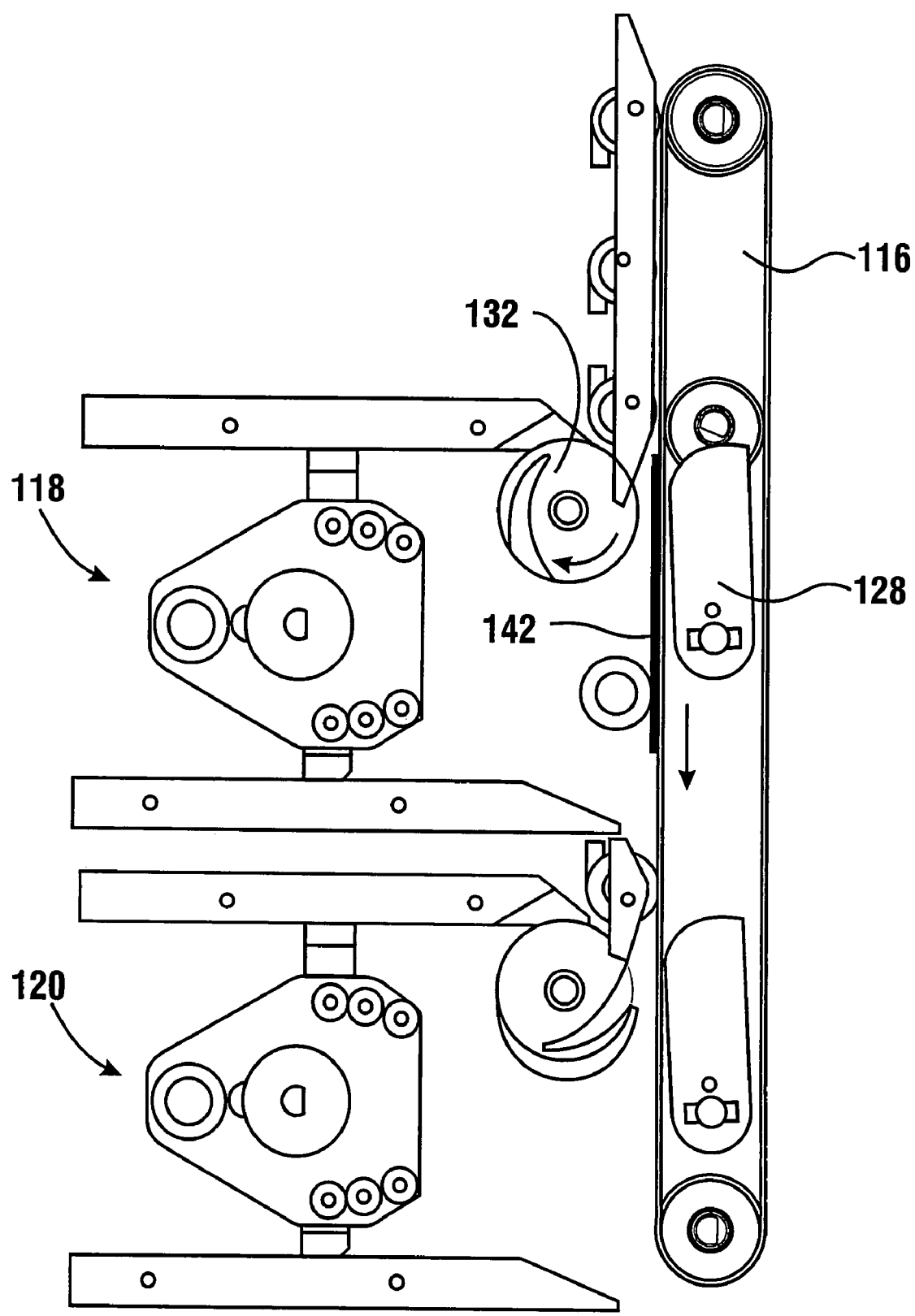
FIG. 5 is a further view of the exemplary sheet stacking mechanism which may be used to hold multiple types of sheets.

FIG. 5 further shows the exemplary operation of exemplary sheet handling mechanisms 118 and 120. In this case a sheet 142 moving in transport 116 is enabled to pass the rotatable member 132 when the gate member 128 remains retracted as the sheet passes. This enables the sheet to move to other sheet handling mechanisms such as sheet handling mechanism 120. This arrangement enables sheets having particular characteristics to be stored together, for example, valid currency notes of different denominations to be collected in stacked relation in selected sheet storage areas. Alternatively in other embodiments sheets of similar types such as checks may be segregated from other financial instrument sheets such as notes or travelers checks. In still other embodiments sheets which are to be recycled such as suitable fit currency notes can be segregated from valid yet worn or soiled currency notes which are not suitable for providing to customers. It should be understood that these approaches are exemplary and in other embodiments other approaches may be used.

Figure 11:
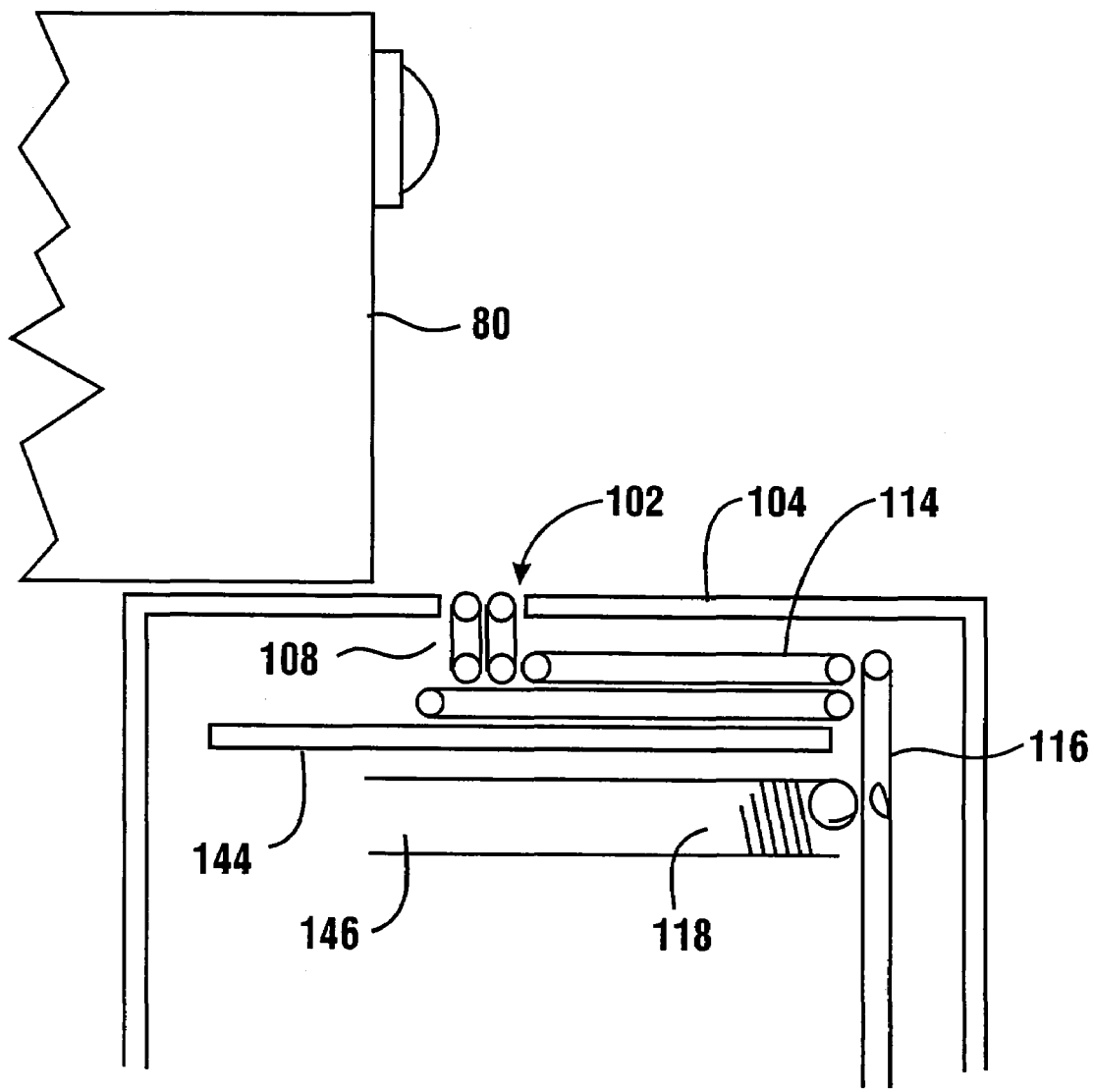
FIG. 11 is a schematic view showing a cash acceptor mechanism moved to a servicing position and exposing the cash accepting opening in an upper portion of the chest of the ATM.

In the exemplary embodiment shown in FIG. 2, a security plate 144 extends within the secure chest in intermediate relation between the horizontal transport 114 and the note storage mechanism such as the storage area 146 associated with sheet handling mechanism 118. The security plate 144 in the exemplary embodiment is secured within the interior of the secure chest and is adapted to prevent unauthorized access through the cash accepting opening 102 in the chest. This may be accomplished by securing the security plate 144 to the walls bounding the interior of the secure chest or other suitable structures. As can be appreciated because in the exemplary embodiment the upper housing portion 54 houses the sheet acceptor mechanism 80, it is generally easier to access the area housing the sheet acceptor mechanism than the secure chest. In cases where criminals may attack ATM 10 and attempt to remove the sheet accepting mechanism, ready access through the cash accepting opening is first blocked by the driving and driven members and other components of the transports 106 and 108. However, in the event that criminals attempt to clear away the transport mechanism components, access to the stored sheets in the note storage mechanisms is still blocked by the security plate. FIG. 11 shows greater detail of the cash acceptor mechanism 180 retracted to a servicing position so as to expose the cash accepting opening. In the exemplary embodiment the cash acceptor mechanism is movably mounted in supporting connection with the chest portion on suitable slides or other members. As can be appreciated in this exemplary embodiment the security plate 144 operates to separate the cash accepting opening 102 from the notes or other valuable financial instrument sheets which are stored below the security plate within the secure chest. Of course the security plate is exemplary and other forms of security plates or other structures may be used.

Figure 20:
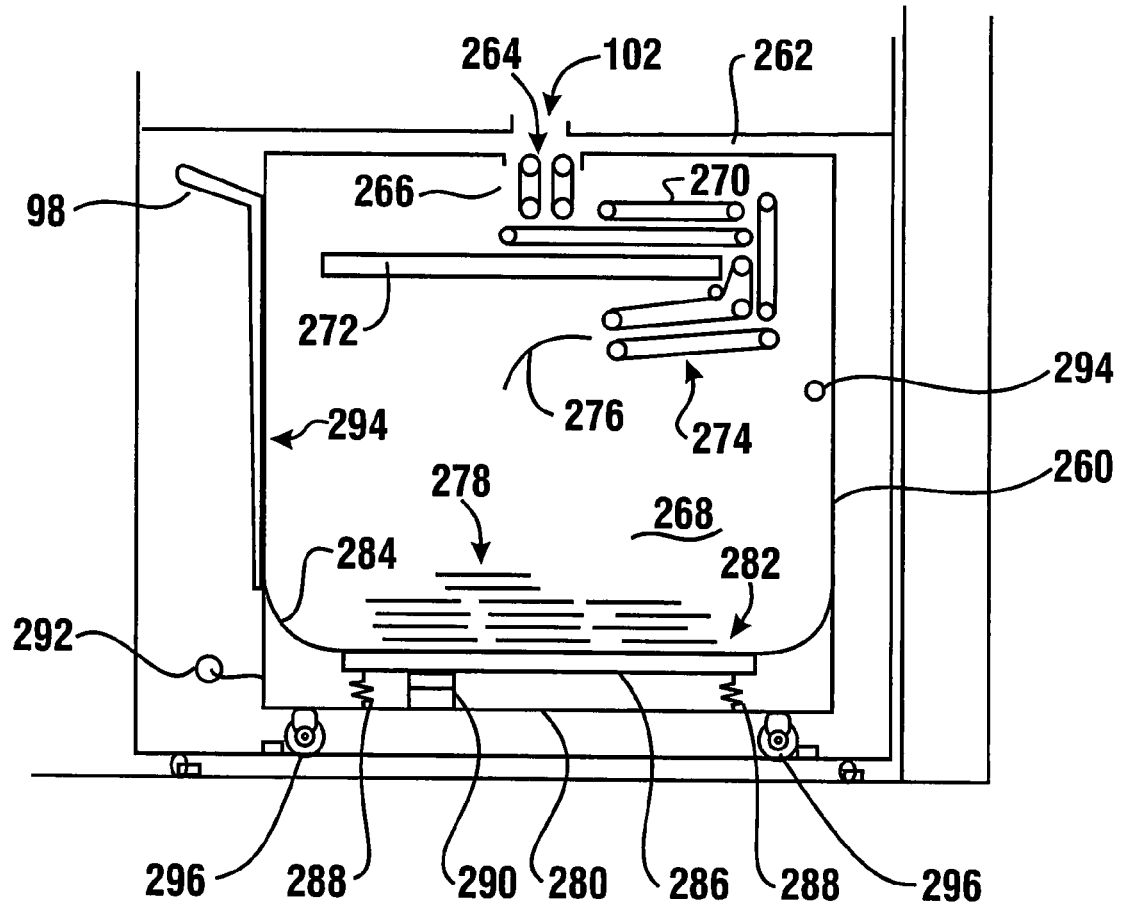
FIG. 20 is a transparent side view of an alternative form of a mechanism for accepting and storing financial instrument sheets that have been processed by the cash acceptor mechanism.

In an alternative embodiment the ATM includes a bulk storage container 260 shown in FIG. 20 for holding currency bills, notes, checks or other items that have been deposited into the machine. The container 260 includes a top wall 262 with an opening 264 which corresponds to opening 102 in the chest when the container 260 is in the operative position. Container 260 includes a transport 266 which transports items that pass through the opening 264 into an interior area 268 of the container. A horizontal transport 270 is operative to move deposited items transversely away from the opening 264. A security plate 272 is positioned to reduce the risk of unauthorized access to the interior area 268. A further transport 274 is operative to move deposit items such as currency sheet 276 to a suitable location for being dispatched into the interior area 268 below the security plate. Deposited items schematically represented 278 are held within the interior area of the container 260.

In the exemplary embodiment the container 260 includes a bottom wall 280. The interior area 268 is bounded by a shaker member 282 that is disposed vertically above the bottom wall. In the exemplary embodiment the shaker member comprises a resilient flexible membrane 284. A rigid plate 286 extends in underlying relation of a central portion of the membrane.

Flexible supports 288 support the rigid plate 286 above the bottom wall 280. The flexible supports further enable movement of the rigid plate and membrane relative to the bottom wall. In exemplary embodiments the rigid supports 288 may include springs or other members which enable relative vertical and/or horizontal movement of the bottom wall and the rigid plate.

In the exemplary embodiment an actuator 290 extends in intermediate relation between the bottom wall and the rigid plate. In exemplary embodiments the actuator is an electrical vibrating device which is operative to shake the rigid plate and overlying membrane. The shaking action of the actuator 290 is operative to impart shaking motion to the deposited items 278 that are in supporting connection with the membrane. This facilitates the dispersal and settling of deposited items and enables a relatively larger quantity of such items to be collected within the interior area 268 before such items need to be removed. In the exemplary embodiment the actuator 290 is electrically connected to the circuitry within the machine through a releasable connector 292. This facilitates removal of the exemplary container as hereafter discussed. In addition, in some embodiments the moving devices for transports within the container may be supplied with signals and/or electrical power through the releasable connector.

In operation of the machine, the interior area 268 of the container 260 is in operative connection with the opening 38 in the housing of the machine through which deposited items are accepted. The deposited items are passed through the cash accepting mechanism or other mechanism for processing such items. Items appropriate for deposit in the container are passed through the opening 102 in the top of the chest. Such items are transported by the transports 266, 270 and 274 to the area below the secure plate 272 and accumulate within the interior area 268. Periodically responsive to the controller, the actuator 290 operates to impart shaking motion to the deposited items 278 within the interior area. This facilitates settling of the items so as to densely pack the items therein. Sensors 294 may be included within the interior area so as to sense the deposited items. The controller may be operative to cause the actuator to shake deposited items responsive to the sensing the level of such items by the sensors. Alternatively the controller may be operative to shake deposited items based on elapsed time, number of items deposited, or other programmable bases. In the exemplary embodiment the sensors 294 may be in operative connection with the controller through the releasable connector 292.

The exemplary container 260 is removably mounted within the secure chest. The exemplary container is supported on rollable supports 296. The rollable supports 296 may be castors, wheels, ball rollers or other type items that enable more ready movement of the container in a loaded condition. In the exemplary embodiment upon opening of the secure chest the container 260 is enabled to moved outward from the chest. This is facilitated by a servicer grasping a handle 298 which is attached to the container. The releasable connector 292 is enabled to be disconnected so that the container 260 can be pulled outward from the secure chest. As shown in greater detail in FIG. 21, in the exemplary embodiment the handle 298 is a telescoping handle that is enabled to be moved upward once the handle has cleared the secure chest. This facilitates moving the container outside of the ATM. Thereafter the container may be moved to a suitable location by the handle away from the ATM for purposes of removing the contents. This may be, for example, an area within a vault or other secure room in which the items within the container may be processed.

Figure 21:
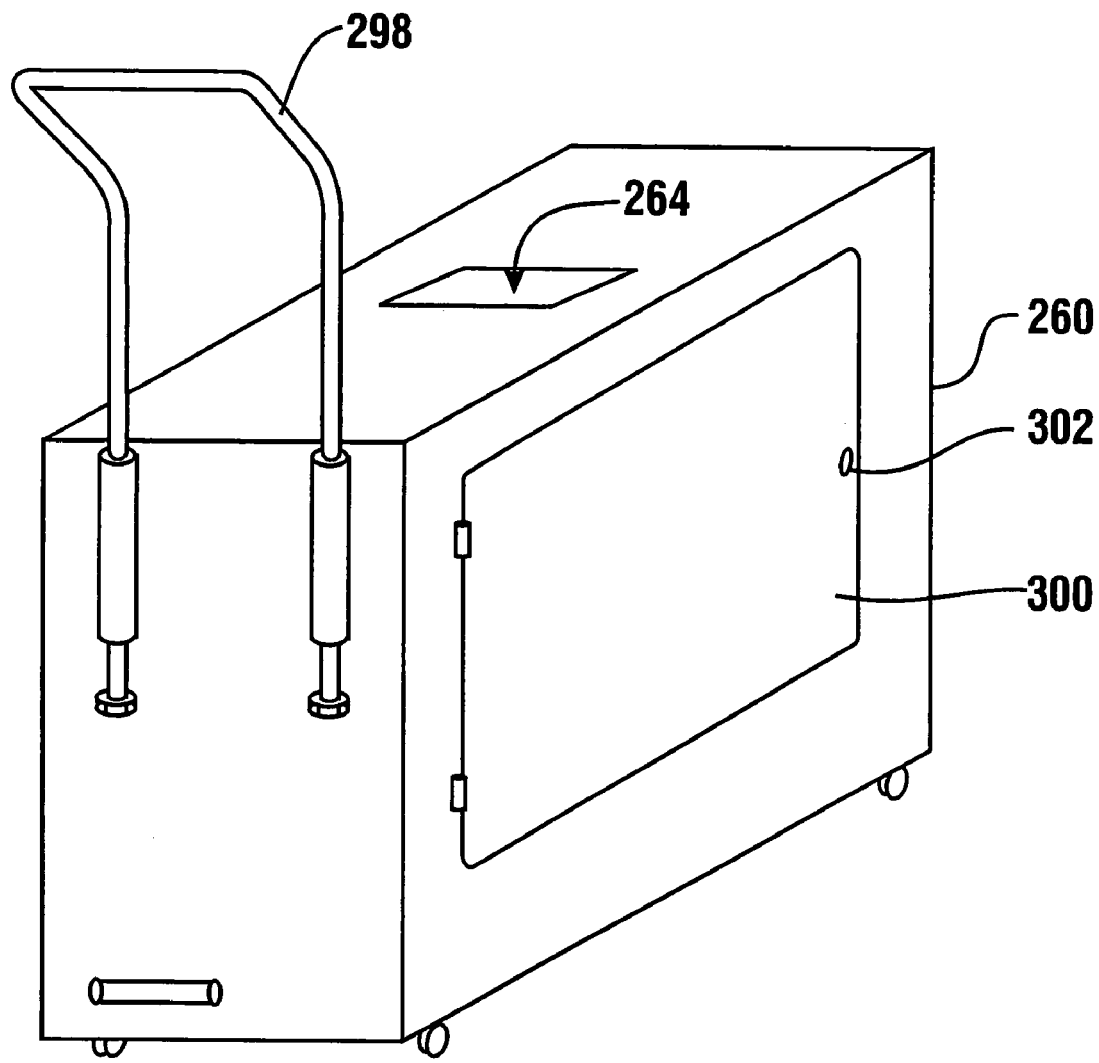
FIG. 21 is an isometric view of the financial instrument holding container shown in FIG. 20, moved outside the machine.

As represented in FIG. 21, the container 260 in the exemplary embodiment includes a door 300. Access to door 300 is controlled by one or more locks represented 302. In the exemplary embodiment door 300 is shown hinged at a side toward the chest door so as to reduce the risk of persons obtaining unauthorized access to the interior of the container when the container is within the machine. Once the container has been moved to a suitable location, the lock 302 may be unlocked, the door opened, and deposited items removed. After the items have been removed, the door 300 may be returned to the closed position. Thereafter the container may be reinstalled in the machine with the handle 298 being retracted so as to enable the container to again be aligned with opening 102. Further, the releasable connector 292 may be reconnected so as to again enable operation of the container within the machine.

As can be appreciated, the exemplary container 260 is enabled to hold a substantial quantity of deposited items. Further, the construction including the rollable supports and telescoping handle facilitates movement of the loaded container out of the ATM and the container into the ATM. It should be understood that the container is exemplary and in other embodiments other approaches may be used. These may include, for example and without limitation, containers which include multiple interior areas in which deposited items are supported on shaking members. Such embodiments may achieve, for example, a separation of deposited notes, checks and/or envelopes by denomination or deposit type, and achieve more densely packed storage within a particular interior compartment within the container. In addition or in the alternative, in other embodiments shaking members may be provided on side walls or on top walls bounding the container so as to facilitate the shaking of deposited items and the packing and storage thereof. In addition or in the alternative, containers may be used in some embodiments in conjunction with sheet handling mechanisms such that certain sheets are stored precisely positioned in containers for purposes of stacking and/or recycling while other sheets are stored in bulk within a container or compartment within a container. These alternatives are encompassed within the teachings of the present invention.

FIGS. 7 through 10 schematically describe a first exemplary embodiment of the picker mechanism 86 used in the cash accepting mechanism 80. In this exemplary embodiment the stack of sheets 84 is positioned in the chute 82 and is in supporting connection with a generally angled lower surface 148. Moving members 150 and 152 are operative to engage the stack and selectively rotate responsive to a motor or other drive mechanism in the direction of Arrow P so as to move the stack into generally abutting relation with an engaging surface 154. Positioned adjacent to the engaging surface 154 in proximity to the lower surface 158 is an idler roll 156 which in this embodiment is a generally free wheeling roll. The engagement of the stack 84 of the engaging surface 154 and the face of the roll 156 is generally operative to splay the sheets as shown.

The picker mechanism 86 further includes a generally cylindrical picking member 158. Picking member 158 is rotatable selectively by a motor or other driving member responsive to the controller 64. The picking member during picking operation rotates in the direction of Arrow P as shown. Picking member 158 further includes high friction arcuate segments 160 which in the exemplary embodiment serve as sheet engaging portions and which extend about a portion of the circumference of the picking member.

Picker mechanism 86 of the exemplary embodiment further includes a plurality of rolls 162 that serve as non-contact stripper rolls in a manner later discussed. The picking mechanism further includes a contact stripper roll 164 which biasingly engages the high friction segments 160 of the picking member.

Figure 8:
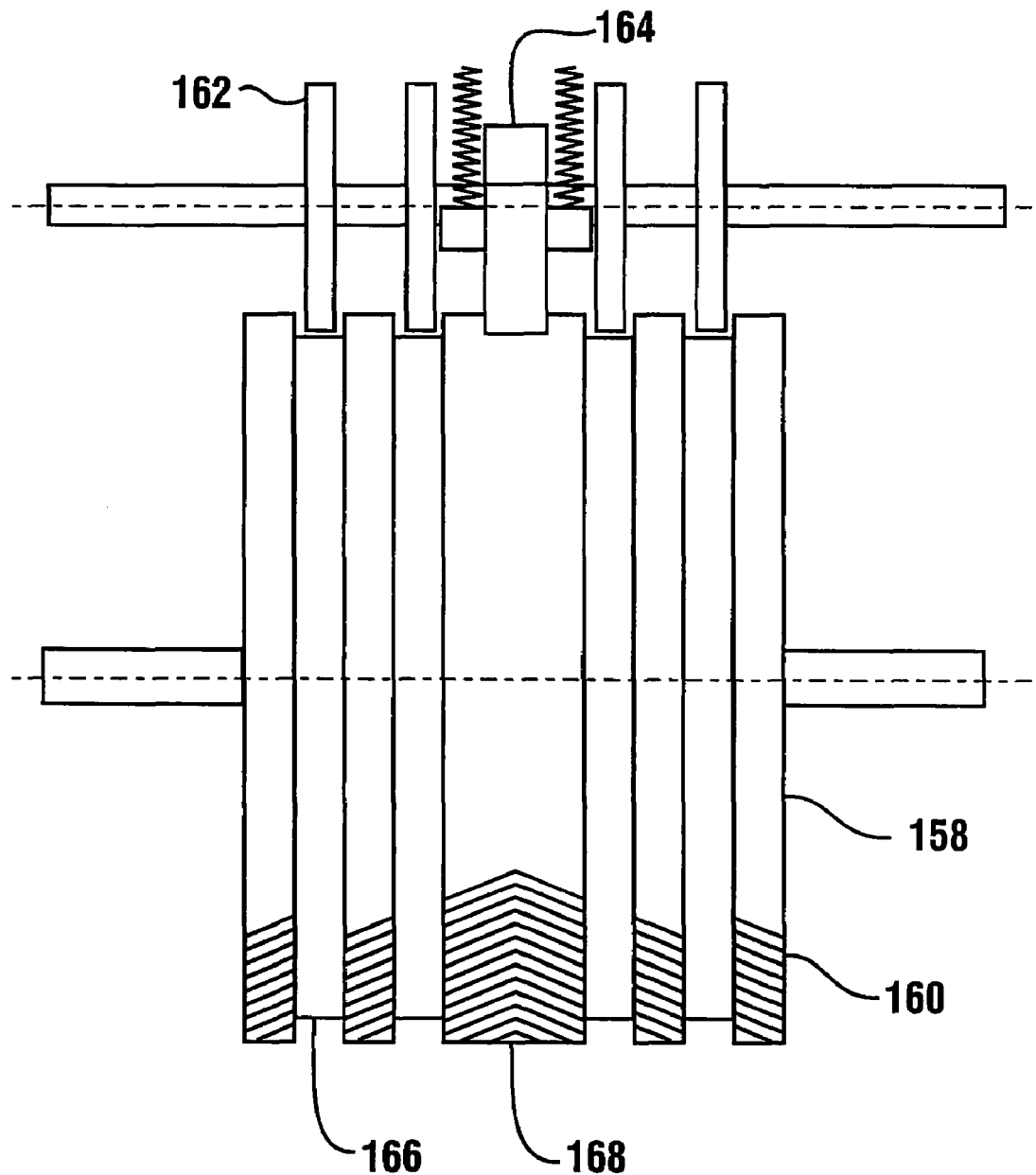
FIG. 8 is a front plan view of an exemplary picking member in combination with a plurality of non-contacting stripper rolls and a contacting stripper roll used for separating individual sheets from the stack.

As represented in FIG. 8, the picking member is a generally cylindrical member that includes a plurality of annular recesses 166. The outer surface of the non-contact stripper rolls 162 extend into a corresponding annular recess 166, but are generally not in stripping engagement therewith. As represented in the exemplary embodiment of FIG. 8, the outer surface of the non-contact stripper rolls 162 are disposed slightly away from the base of the annular recess. As a consequence the outer surface of the non-contact stripper rolls which serve as a first stripper portion are not positioned to be in direct contact stripping engagement with the picking member. However, because the surface of such rolls is disposed in close proximity thereto and generally enables only a single sheet to pass between the picking member and the non-contact stripper rolls, the separation of a single sheet from other sheets is generally achieved. It should be understood however that while in the exemplary embodiment the non-contact stripper rolls are disposed slightly from the picking member, in other embodiments such rolls or other stripper members may operate to actually contact the picking member but may be of such resilient consistency or other properties that the rolls are not in a biased contact stripping engagement as is the case with the contact stripper roll 164.

As shown in FIG. 8 the contact stripper roll is biased to engage a central sheet engaging portion 168 of the picking member. This central sheet engaging portion is generally centered with regard to sheets that are moved by the picker mechanism 86. This reduces the tendency of sheets to twist or skew as they are being moved in the picker mechanism. Of course it should be understood that this arrangement is exemplary and in other embodiments other approaches may be used.

Figure 9:
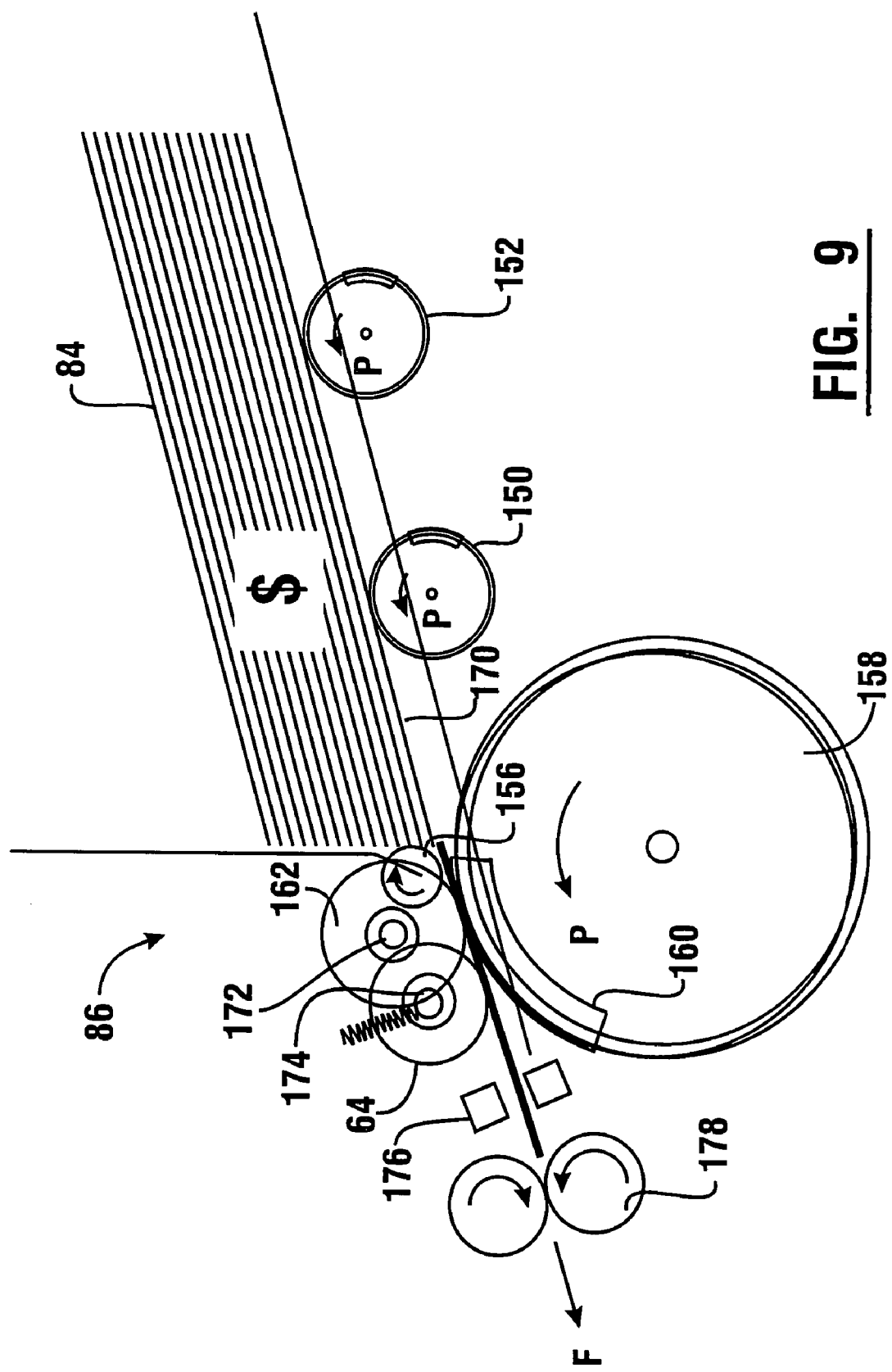
FIG. 9 is a schematic view showing separation of a first sheet from a sheet stack through operation of the mechanism shown in FIG. 7.
Figure 10:
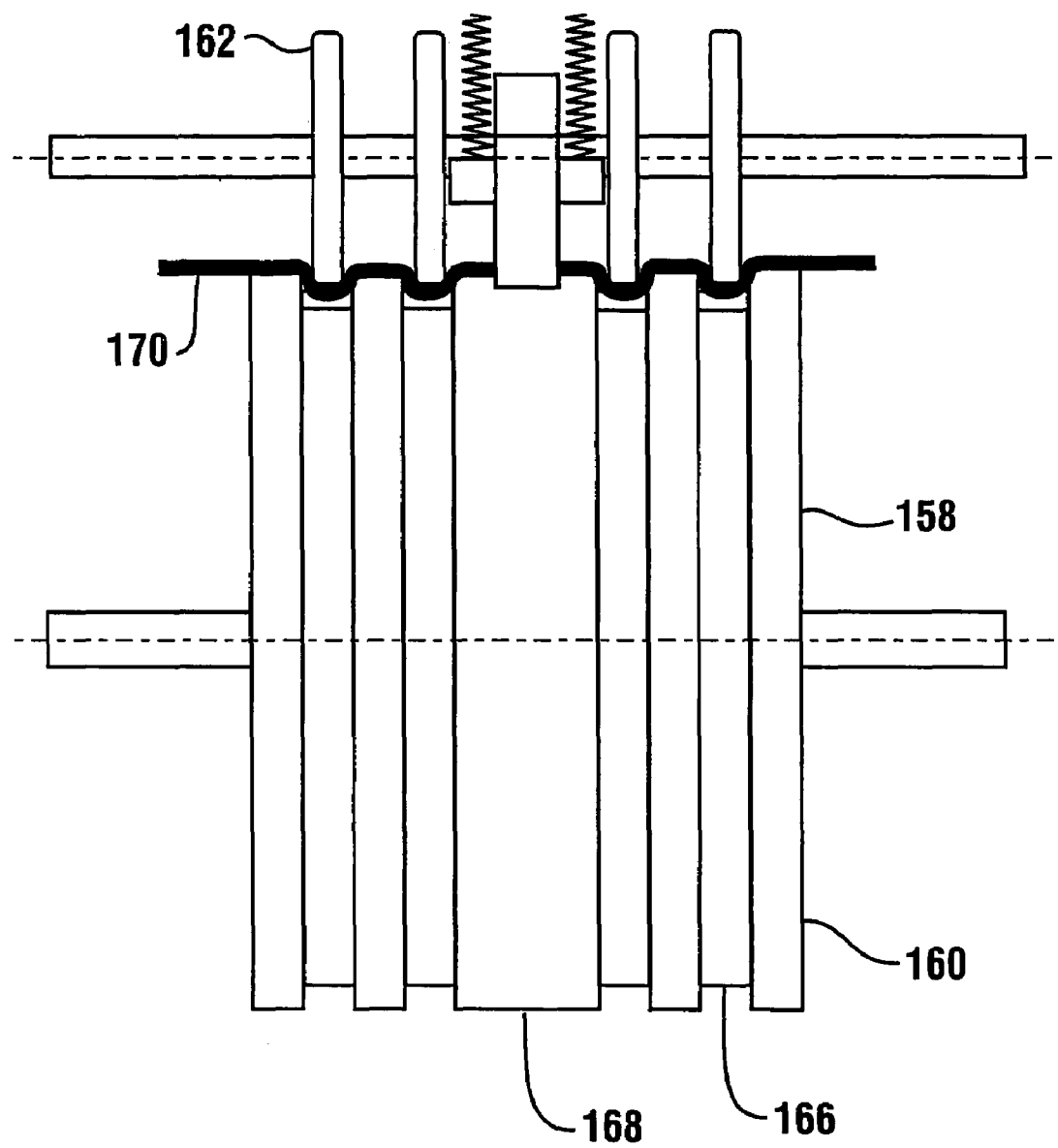
FIG. 10 is a view showing a cross-sectional wave configuration imparted to a sheet through action of the picking member and the non-contacting stripper rolls.

The operation of the exemplary picker mechanism 86 is represented in FIGS. 9 and 10. The picker mechanism is operative to separate sheets individually from the stack 84. This is done by sequentially picking a first sheet 170 which bounds the lower end of the stack while moving the first sheet in a first direction generally indicated by Arrow F so as to move the sheet away from the stack. To accomplish this the controller 64 operates one or more drives such as motors or other moving mechanisms to cause the moving members 150 and 152 to rotate as the picker mechanism 168 similarly rotates in a counterclockwise direction as shown. The rotation of the picking member causes the high friction arcuate segments 160 which serve as sheet engaging portions to engage a lower face of the first sheet and pull the sheet in intermediate relation between the picking member and the non-contact stripper rolls 162. As the first sheet is moved the idler roll 156 rotates to facilitate the movement of the first sheet between the picking member and the non-contact stripper rolls.

The non-contact stripper rolls 162 of this exemplary embodiment are in operative connection with a one-way clutch 172 such that the first stripper rolls remain stationary when the first sheet is engaged therewith and moving in the direction of Arrow F. Because the resistance force provided by the non-contact stripper rolls against the face of the sheet engaged therewith is less than the moving force imparted to the opposed face of the sheet, the first sheet 170 is moved into intermediate relation between the picking member and the non-contact stripper rolls. This causes the sheet to assume the cross-sectional wave configuration shown in FIG. 10. This is caused by the sheet being deformed by the non-contact stripper rolls into the annular recesses 166 of the picker member. This cross-sectional wave configuration is generally operative in combination with the opposing force applied by the non-contact stripper rolls, to separate the first sheet from other sheets that may be moving therewith from the stack.

As the first sheet 170 moves further in the direction of Arrow F as shown in FIG. 9, the leading edge of the sheet then engages the contact stripper roll 164 which is biased to engage the sheet engaging portions of the picking member. The contact stripper roll of this exemplary embodiment is also in operative connection with a one-way clutch 174 such that in this exemplary embodiment the contact stripper roll remains stationary as the first sheet moves in the direction of Arrow F. The engagement of the contact stripper roll and the first sheet operates to displace the contact stripper roll so as to enable the sheet 170 to move in intermediate relation between the contact stripper roll and the central sheet engaging portion 168. The resistance force of the non-contact stripper roll is generally operative to separate any sheets other than the first sheet 170 from moving in the direction of Arrow F.

As shown in FIG. 9 the sensor 176 is positioned adjacent to the contact stripper roll in the exemplary embodiment. Sensor 176 is operative to sense the presence of overlapping double sheets adjacent the sensor which may have been able to pass the non-contact and contact stripper rolls. Suitable sensors in some embodiments may be those shown in U.S. Pat. Nos. 6,241,244 and 6,242,733, the disclosures of which are incorporated herein by reference. Upon sensing a double or other multiple sheet the controller of the machine is enabled to make additional attempts to strip the sheet as later discussed. However, in the event that only a single sheet is sensed the picker member 158 continues moving in the counterclockwise direction until the leading edge of the sheet reaches takeaway rolls 178. In the exemplary embodiment takeaway rolls are operative to engage the sheet and to move the sheet in the cash accepting mechanism toward the validator device 88. In the exemplary embodiment one rotation of the picking member is generally operative to separate one sheet from the stack.

In the event that the sensor 176 senses that overlapping double sheets or other multiple sheets have been able to pass the contact and non-contact stripper rolls, the controller of this exemplary embodiment is operative to stop the movement of the picker member 158 in the counterclockwise direction as shown prior to the first sheet 170 being disengaged therefrom. Thereafter the controller is operative to reverse the direction of the picker member 158 and the moving members 150 and 152 so as to move the first sheet back toward the stack. Through the operation of one-way clutches 172 and 174 the contact stripper roll 164 and the non-contact stripper rolls 162 are enabled to rotate in a counterclockwise direction as shown so as to facilitate the return of the sheets to the stack. Thereafter the controller may operate the picker mechanism 86 to again attempt to pick a single bill. Repeated attempts may be made until a single sheet is separated from the stack so that it may be processed by the cash acceptor mechanism.

It has been found that the exemplary embodiment of the picker mechanism 86 is well adapted for separating various types of financial instrument sheets having different properties. In general, sheets such as currency notes that are new or other types of sheets which have generally consistent properties of rigidity and friction from sheet to sheet are separated through the operation of the picker mechanism and the non-contact stripper rolls. However, in situations where rigidity and frictional properties vary substantially from sheet to sheet, the contacting stripper roll which subsequently engages the sheets after they have engaged the non-contact stripper rolls is effective in separating sheets that would not otherwise be separated. This may be particularly helpful for example in processing sheets that may include plastic and paper currency notes, checks or other documents that have significantly variable properties and which are mixed together in a stack from which the sheets must be individually picked.

In some alternative embodiments some additional features may be included to further help to facilitate the picking of sheets. This may include, for example, making provisions for selectively driving the stripper rolls or other members so as to move overlapping multiple sheets which are initially enabled to pass the stripper members, relative to one another. Such reorientation may facilitate separating the sheets in subsequent picking attempts.

Figure 28:
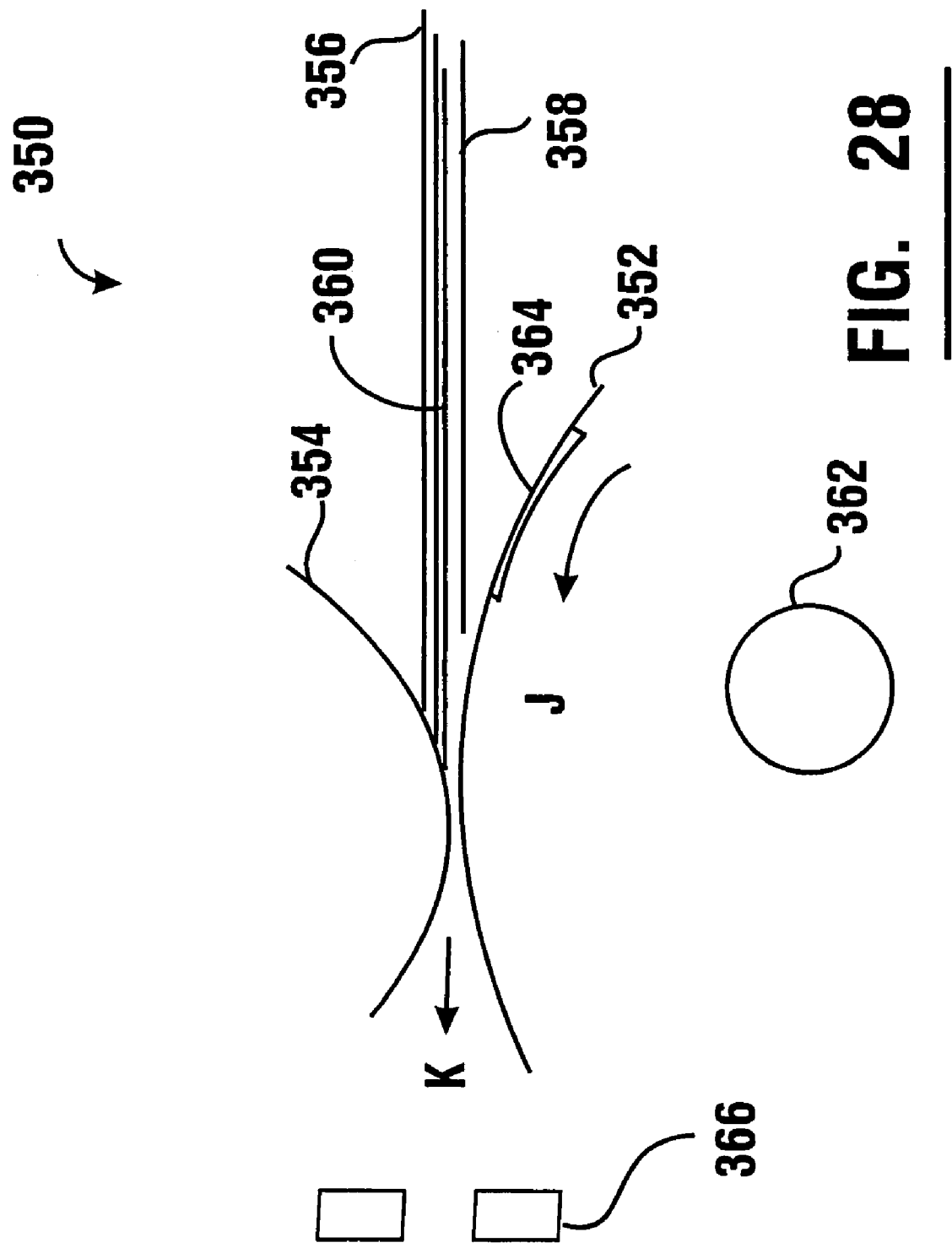
FIGS. 28 through 30 are schematic views of an alternative embodiment of a mechanism for separating sheets from a stack in which one or more stripper devices operate to reorient the sheets relative to one another so as to facilitate picking and separating of the sheets.
Figure 29:
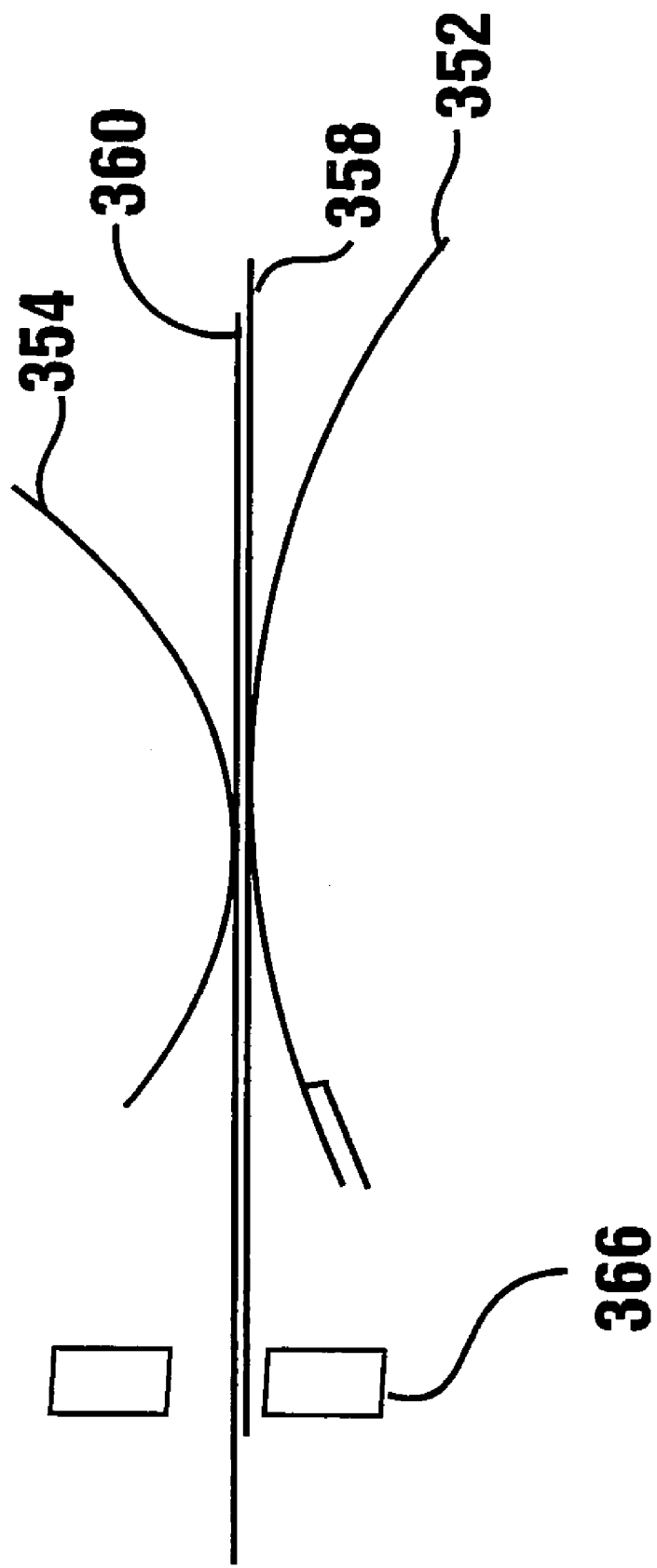
Figure 30:
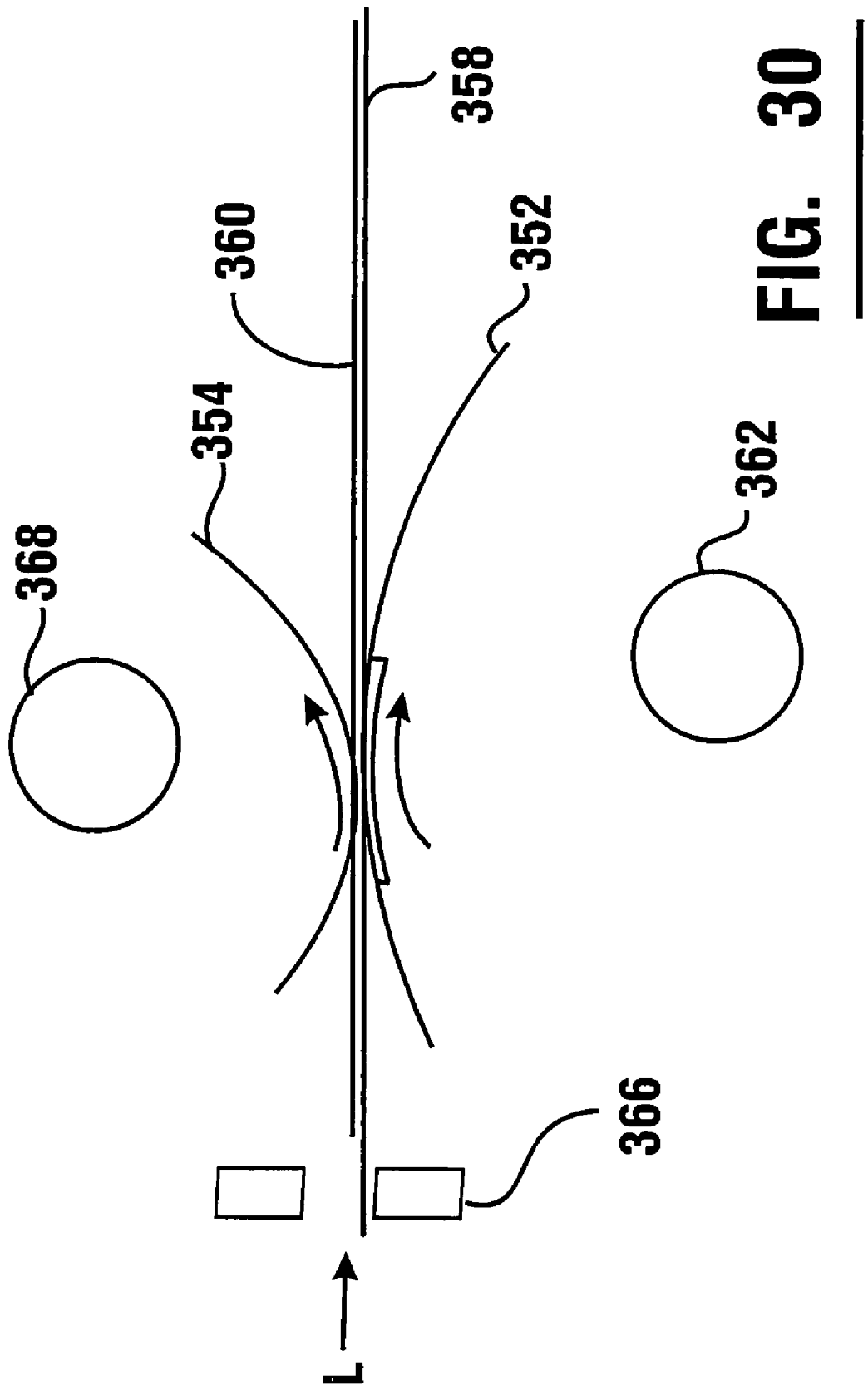

FIGS. 28 through 30 show schematically an alternative picker mechanism 350. Picker mechanism 350 may be of the type previously discussed, which includes one or more non-contact stripper rolls and contact stripper rolls or other type of arrangement. For purposes of simplicity and to facilitate explanation, mechanism 350 is schematically shown as a mechanism which includes a picking member 352 and a stripper member 354. In the exemplary embodiment, the picking member and stripper member are cylindrical members, but of course in other embodiments other types and configurations of members may be used.

To illustrate the problem which can be encountered by a picker mechanism, a plurality of sheets 356 are shown in engagement with the picking member. As will be appreciated from the prior discussion, sheets 356 may be part of a stack of sheets input by a user to the ATM. As schematically represented in FIG. 28, a sheet 358 which bounds the lower end of the stack and which is normally the sheet which is picked therefrom, has its leading edge retracted relative to the direction in which sheets move while being picked relative to an overlying sheet 360. As can be appreciated, when sheets approach the picking and stripper members in this orientation, it becomes more difficult to pick sheet 358 individually because its leading edge is retracted relative to the other sheets. As a result, when the picking member 352 is driven in the picking direction indicated by Arrow J responsive to one or more connected drives 362, the stripper member 354 remains stationary. However, the high friction segment 364 may engage the area of the overlying sheet 360 that is exposed thereto, because it is advanced beyond sheet 358 in the forward direction represented by Arrow K in which sheets move as they are picked from the stack. As a result, both sheets 358 and 360 are moved together from the stack.

As sheets 358 and 360 move together, their leading edges eventually come adjacent to sensor 366, as shown in FIG. 29. Sensor 366 may be one of the types previously discussed which is operative to sense sheet thickness and in conjunction with one or more controllers is operative to sense conditions where multiple overlapping sheets have been sensed. As with the prior embodiment, when multiple sheets are sensed as having been moved from the stack, the picking member 352 is no longer moved so as to move sheets in the picking direction.

Upon sensing multiple sheets adjacent to the sensor 366 the controller of the exemplary alternative embodiment is operative to actuate drive 362 so as to reverse the direction of the picking member 352 from that when picking sheets out of a stack. As shown in FIG. 30 and discussed in conjunction with the previously described embodiment, the reversal of direction of the picking member is operative to move the picked sheets in a direction back towards the stack. This is indicated by Arrow L in FIG. 30. However in this alternative embodiment, stripper member 354 is driven responsive to a drive 368 in a rotational direction so as to urge sheets 360 and 358 to move back towards the stack. Further in this exemplary embodiment, one or more controllers are operative to control drives 368 and/or 362 so that sheet 360 in direct engagement with stripper member 354 is moved relative to sheet 358. In this exemplary embodiment, sheet 360 is preferably moved so that its leading edge is no longer advanced in the picking direction from the leading edge of sheet 358 which bounds the lower end of the stack. In this way, once both sheets have been retracted beyond the stripping members, one or more subsequent attempts to move the sheets in the stripping direction will cause sheet 358 to be separated individually from the other sheets.

Several approaches may be taken to moving the sheet 360 which is engaged with the stripper member relative to the sheet 358 which is in engagement with the picking member. Generally such approaches require sheet 358 to be urged by the action of the stripper member to move a distance greater than the distance that the sheet 358 is moved back towards the stack. This may be accomplished, for example, by the controller causing drive 368 to begin rotating stripper roll 354 in the counterclockwise direction as shown while picking member 352 and sheet 358 engaged therewith are each held stationary. This may serve to begin moving sheet 360 in the direction of Arrow L without movement of sheet 358. In some embodiments, the controller in operative connection with sensor 366 may sense that sheet 360 has moved. This may be accomplished by sensing that as stripper roll 354 begins to move, the sheet thickness that is sensed in proximity to the sensor changes from a multiple sheet thickness to a single sheet thickness. This may serve to verify that sheet 360 has moved relative to sheet 358. Thereafter the controller may begin operating picking member 352 to begin moving sheet 358 back towards the stack.

It should be understood that in some embodiments the stripper roll may begin moving the overlying sheet engaged therewith prior to any movement to retract the underlying sheet in engagement with the picking member. Alternatively in some embodiments, both the stripper and the picking member may move to begin retracting the multiple sheets, and the picking member may stop once or multiple times in the retraction process so as to facilitate the retraction of the overlying sheet 360. Such periodic stopping and starting may facilitate the relative movement of the sheets. Of course as can be appreciated, such movement will cause the overlying sheet 360 to move in a direction back towards the stack a distance greater than the underlying sheet 358, thus changing the relative orientation of the sheets.

In alternative embodiments from the position shown in FIG. 29, both the picking member and the stripper members may move simultaneously to cause the sheets to be retracted. However, the stripper members may move so as to urge sheet 360 to move at a higher rate of speed than the underlying sheet 358. In such embodiments, the overlying sheet 360 will be urged to move a greater distance due to the relatively higher speed of stripper member 354. Such higher speed movement generally causes the sheet 360 to move a greater distance than sheet 358, thus reorienting the leading edge of the sheet 360 so that is no longer advanced in the stripping direction relative to sheet 358. Alternatively or in addition in some embodiments, both the picking member and the stripper members may move to retract the sheets relative to the stack, but the stripper member may operate to urge sheets to move back towards the stack for a longer time. Again, this action tends to move the overlying sheet or sheets relative to the underlying sheet found in the stack, and thus reorient the sheets.

As can be appreciated, in some exemplary embodiments moving members such as the rolls 150, 152 described in connection with the prior embodiment may also be driven responsive to one or more drives in operative connection with a controller. The controller may operate such moving members when sheets are being retracted into the stack to coordinate their speed so as to correspond with that of the picking member. As a result, by moving the moving members at the same or slightly lower speed than the picking member, the risk that the sheet 358 bounding the stack will be moved so that its leading edge is retarded relative to an overlying sheet is reduced. Likewise, when further attempts are made to separate sheets by moving the picking member in a picking direction, the moving members which underlie sheet 358 may urge the sheet to move at the same or slightly faster rate than the picking member so as to urge sheet 358 to be reoriented so that overlying sheets are not removed from the stack along with the sheet bounding the stack.

Of course it should be understood that these approaches are exemplary, and in other embodiments other approaches may be used towards reorienting the relative positions of sheets so as to facilitate the picking thereof individually from the stack so that individual sheets may be moved and processed by the machine. Further, it should be understood that while in the exemplary alternative picking mechanism 350 only one stripper member is shown, the principles described may be applied to multiple stripper members. Such stripper members may include both the contact and non-contact strippers previously discussed. In some alternative embodiments where multiple stripping members are used, the controlled movement of the stripping members so as to impart relative movement to sheets may be applied to both the contact and non-contact stripping rolls, or to only selected ones of such rolls. For example, in some embodiments like that previously described, the contact stripper rolls may operate through use of a one-way clutch while the non-contact stripper rolls may be driven so as to change the relative positions of sheets. Further, in some alternative embodiments, the relative movement may be imparted by an orienting roll such as roll 156, which may in some embodiments be used to perform at least part of the stripper function. Additional sensors may also be provided in some embodiments to help determine if the desired relative movement of overlapping sheets has been achieved. Of course these approaches are exemplary, and in other embodiments other approaches may be used.

It should be understood that while picking rolls and cylindrical members are used in the exemplary embodiment, in other embodiments other picking and stripping structures such as belts, pads, fingers and other members may be used.

The exemplary embodiment of ATM 10 comprises a through-the-wall type machine in which the fascia is exposed to the elements. As a result, rain and snow may impact on the fascia and in the absence of suitable measures may enter the machine. As can be appreciated the cash accepting opening 40 in the fascia must be sufficiently large to accept the chute 82 which holds a stack of documents 84 as previously discussed. During transactions when an authorized user indicates that they wish to insert the stack of sheets into the chute, the gate 44 must be opened which results in exposure of the chute to the elements.

Figure 17:
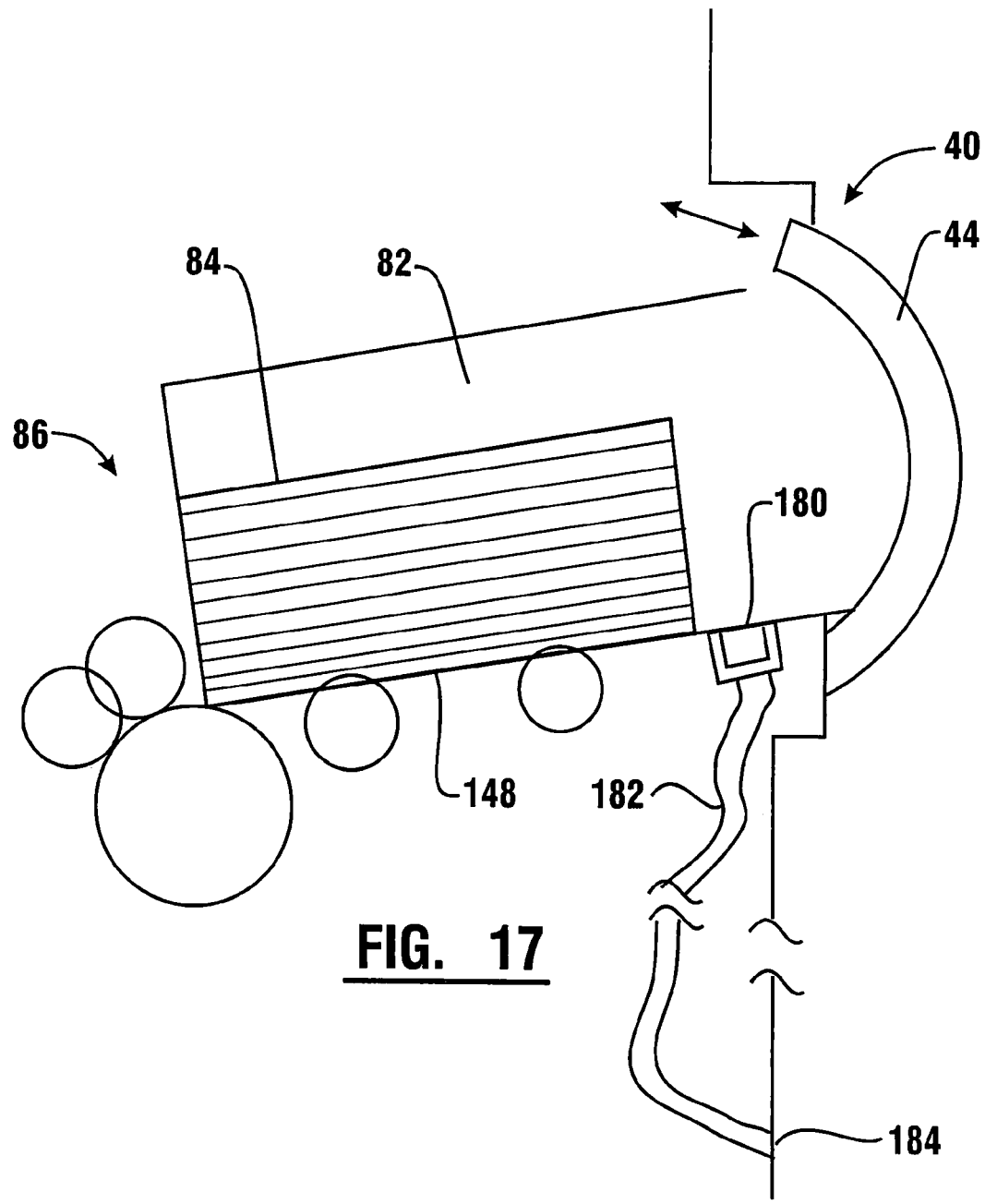
FIG. 17 is a schematic cross-sectional view of a chute to and from which stacks of sheets are received and removed through the fascia of the machine, and including devices for capturing and draining water which may enter the chute.
Figure 18:
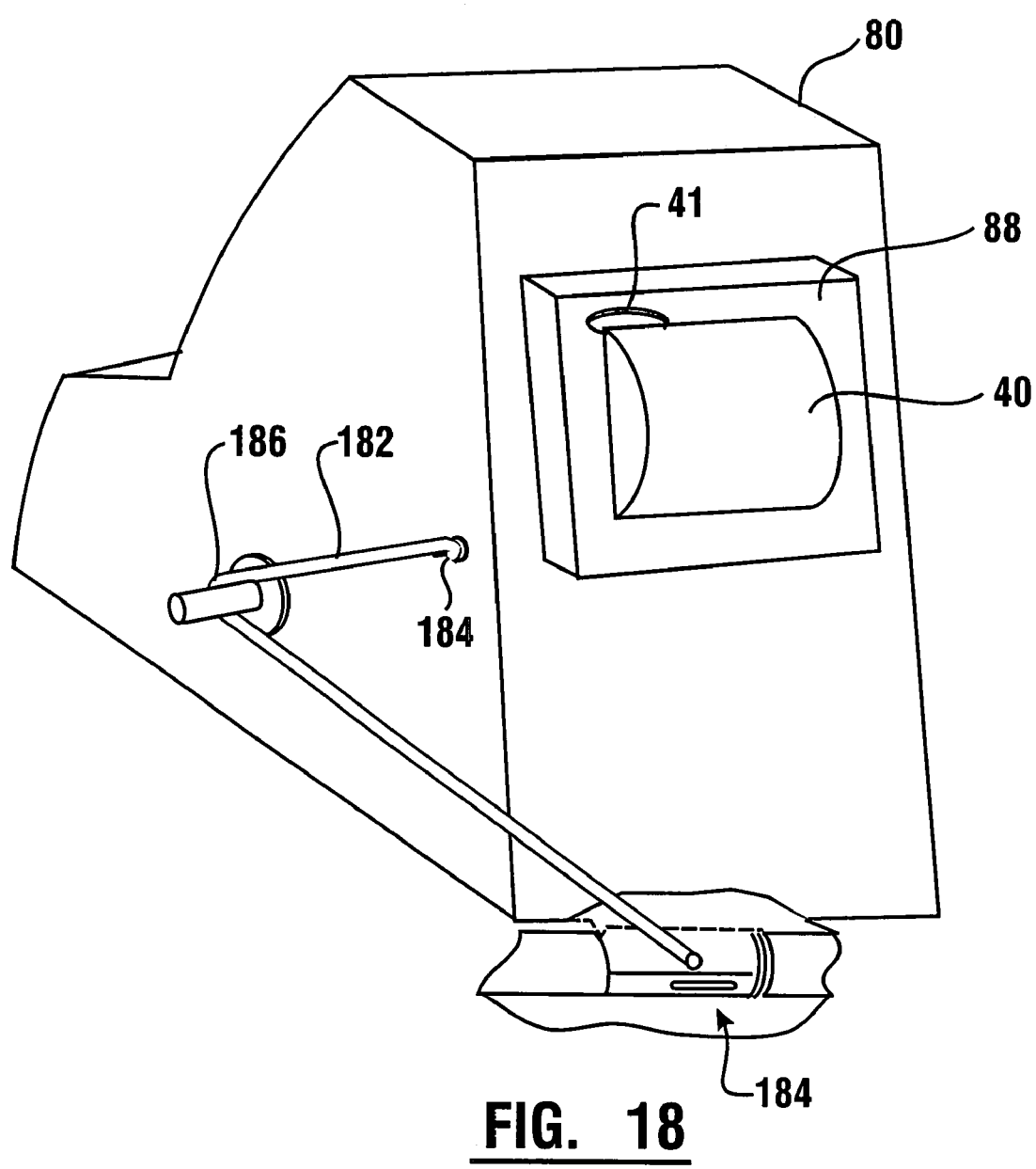
FIG. 18 is an external isometric view of the cash acceptor mechanism represented in FIG. 17 and including a schematic representation of the drain used for passing water collected in the chute to the outside of the machine.
Figure 19:
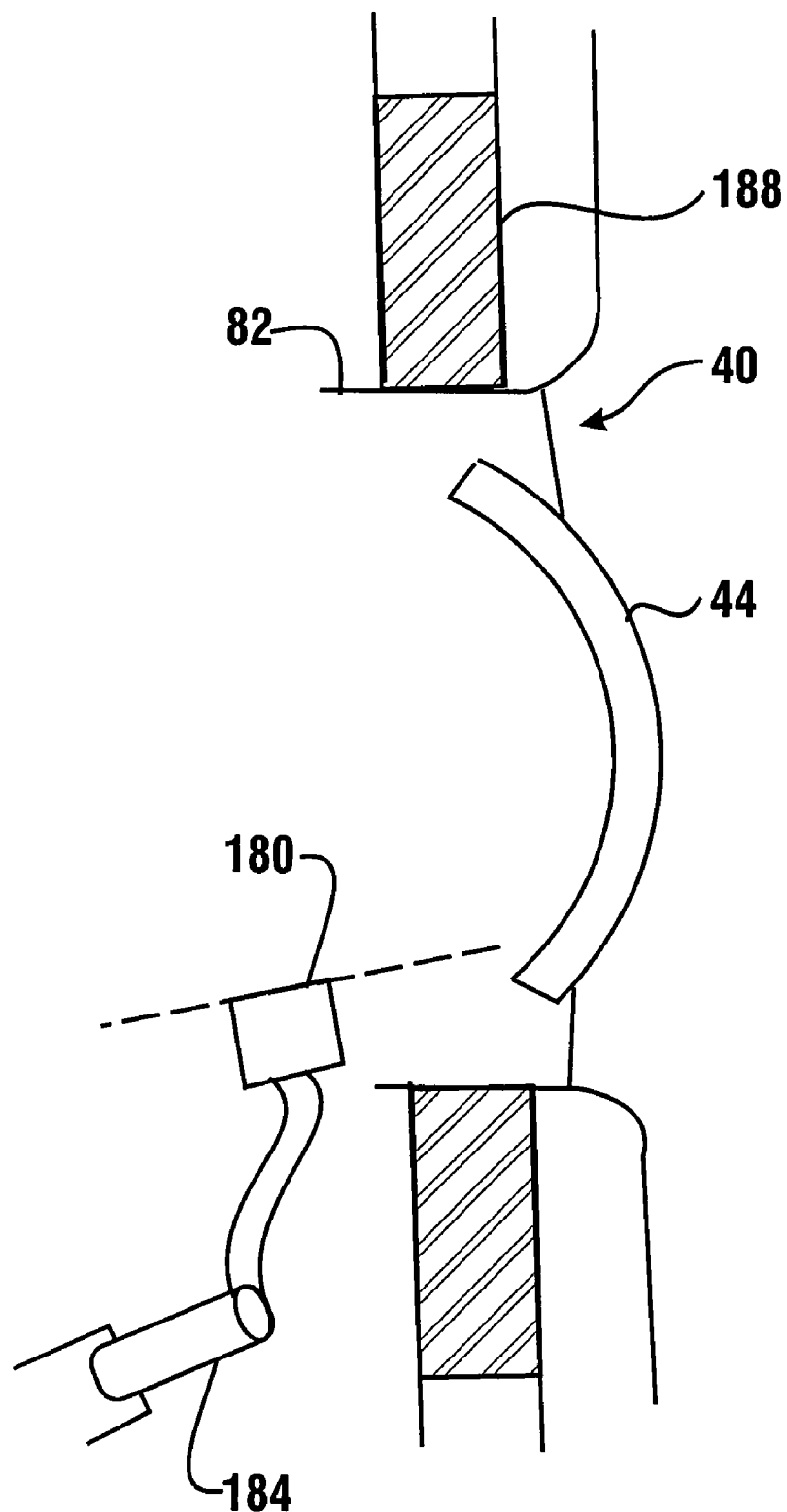
FIG. 19 is a schematic view representative of a sealing system used in an exemplary embodiment to minimize the risk of contaminants entering the machine through the opening in the machine fascia through which the chute extends in an operative position of the cash acceptor mechanism.

To minimize the risk posed by rain and snow to the currency acceptor mechanism 80, the exemplary embodiment includes the capability to capture and direct from the machine moisture which may enter the chute. The approach used in the exemplary embodiment is represented in FIGS. 17 through 19. As shown in FIG. 17, the lower surface of the chute 148 includes at least one water accepting opening 180 therein. In the exemplary embodiment the water accepting opening comprises one or more troughs which extend transversely across the lower surface of the sheet. Of course in other embodiments other approaches may be used. The fluid accepting openings are in fluid connection with a conduit schematically represented 182 which is in fluid connection with a drain 184 which delivers the water outside the ATM. As represented in FIGS. 18 and 19 the trough 180 is in operative connection with a fluid fitting 184 which connects to a generally flexible fluid conduit 182 such as a tube. The conduit 182 connects to the drain 184 which in the exemplary embodiment includes a cavity at a lower side of the fascia and which includes openings through which the water may drain to the outside of the machine housing.

In the exemplary embodiment a tube support 186 is positioned to control the direction of the tube and assure drainage when the cash acceptor mechanism is in the operative position as well as when the cash acceptor mechanism is in a service position such as is shown in FIG. 12. In the exemplary embodiment the tube support minimizes the risk of the fluid conduit being crimped or otherwise assuming a position which prevents the drainage of water from the interior of the chute to the outside of the machine. It should be understood, however, that the approach shown is exemplary and in other embodiments other approaches may be used.

In the exemplary embodiment, provision is made to minimize the risk of moisture entering the ATM in the area of the cash accepting opening through which the chute 82 extends in the operative position of the cash acceptor mechanism 80. As shown in FIGS. 18 and 19, in the exemplary embodiment a resilient gasket 188 extends in surrounding relation of the chute 82 in the area adjacent to the fascia. The resilient gasket is supported on a front face of the cash acceptor mechanism. As shown in FIG. 19, when the cash acceptor mechanism 80 is positioned such that the chute extends through the cash acceptor opening 40 in the fascia, the resilient gasket is positioned in sandwiched fluid tight relation between the front face of the cash acceptor mechanism and the interior face of the fascia. As the seal provided by the gasket extends in surrounding relation of the chute, the risk of moisture or other contaminants entering the ATM through the cash acceptor opening is minimized. Of course it should be understood that this approach is exemplary and in other embodiments other approaches may be used.

As discussed in connection with FIG. 2, the cash acceptor mechanism 80 in response to operation of the validator device 88 and the controller 64 determines at least one characteristic indicative of whether financial instrument sheets are acceptable to the machine. In the exemplary embodiment unacceptable sheets may be suspect sheets such as potentially counterfeit notes, invalid checks or other unacceptable documents. When such documents are detected, they are directed to a storage area 100 which in the exemplary embodiment is within the cash acceptor mechanism and outside the chest portion. Periodically these unacceptable sheets must be recovered by servicing personnel for purposes of either verifying the invalidity of the sheets or for purposes of tracing the sheets to the user who placed them in the machine. In the exemplary embodiment such sheets are recoverable by authorized persons who have access to the upper housing portion 54 but who may be prevented from having access to the chest 48 where documents determined to be valid are stored.

In the exemplary embodiment access to the storage area 100 is controlled by a suitable access device. In one form of such an access device shown in FIG. 12, an opening 190 is provided to the storage area 100. Access to the opening is controlled by a flip-down access door 192. In some embodiments, the flip-down access door 192 may be opened only when the cash acceptor mechanism 80 has been moved rearward to extend outside of the housing subsequent to opening access door 58. In some embodiments the flip-down access door may be provided with a locking mechanism 194 such as a key lock or other suitable locking mechanism. As a result in this exemplary embodiment in order to access the sheets in the storage area 100, the user could be required to have the necessary capabilities through keys, combinations or otherwise to unlock both lock 62 on access door 58 as well as lock 194 and flip-down door 192 in order to access the sheets. It should be understood, however, that although in the embodiment shown the cash acceptor mechanism 180 is shown retracted out of the machine to facilitate opening the flip-down door and extracting the sheets, in other embodiments the flip-down door may be sized, segmented or otherwise adapted such that the cash acceptor mechanism may not need to be retracted from its operative position in order to access sheets in the storage area 100.

FIG. 13 shows yet a further alternative for accessing sheets in the storage area 100. In this exemplary embodiment an opening 196 is provided through the storage area so as to enable access to the sheets therein. Access through opening 196 is provided to a sliding door 198. Door 198 is operative to slide along the direction of Arrow S in opposed tracks, slots or other suitable mechanisms for holding and guiding the door in supporting connection with the cash acceptor mechanism. In some embodiments door 198 may include a locking mechanism 200. Locking mechanism 200 may be a suitable key, combination or other locking mechanism for assuring that only authorized personnel are enabled to access the documents in the storage area. As can be appreciated from FIG. 13, door 198 may be both unlocked and opened without having to retract the cash accepting mechanism rearward. In some embodiments this may serve to speed servicing and the removal of invalid sheets from the machine.

FIG. 14 shows yet another exemplary embodiment for accessing sheets in the storage area 100. In this embodiment an opening 202 is provided in a rear face of the cash accepting mechanism 80. Access to opening 202 is controlled by a door 204. In the exemplary embodiment door 204 is a sliding door adapted to be selectively moved in tracks, slots or similar devices. In some embodiments a suitable locking mechanism schematically indicated 206 is used to assure that only authorized personnel have access to the door. In the embodiment shown in FIG. 14, a transport 208 is provided for moving the sheets in the storage area 100 to the service personnel through the opening 202. A transport 208 may be operative in response to provided to input devices by the servicing personnel or may be automatic responsive to the opening of the door 204. Of course it should be understood that all of the approaches shown are exemplary and in other embodiments other approaches may be used.

In some exemplary embodiments suspect notes or other documents are correlated with particular transactions conducted at the machine and/or with particular users of the machine. This may be accomplished through operation of the validator and the controller in the manner shown in U.S. patent application Ser. No. 09/993,070, the disclosure of which is incorporated herein by reference. In some exemplary embodiments the suspect documents in storage may be arranged in a particular order and the controller is operative to provide one or more outputs such as through a screen or a printer indicating the transactions and/or users which correspond to the suspect sheets. Alternatively or in addition, provisions may be made for the cash acceptor mechanism to be in operative connection with a printer which prints transaction and/or user identifying information on each of the suspect sheets. This may include for example, visible or non-visible indicia. In some embodiments the indicia may be removable such as removable labels or indicia that can be washed off or otherwise removed or neutralized. In other embodiments the characteristics determined by the validator may be such that the data is sufficiently detailed and of types that create a unique electronic profile of each suspect sheet. This data can be stored at the machine in a data store through operation of the controller or elsewhere in a connected data store. This sheet identifying data may then later be used by a servicer or other persons recovering or analyzing the suspect sheets to correlate each sheet with the transaction and/or user that provided the sheet to the machine. This may be done in some embodiments by putting the machine controller in a mode for such analysis and feeding each suspect sheet through the cash acceptor mechanism. The controller may then operate to correlate the stored data related to the transaction and/or user with the stored data that uniquely identifies the sheet. Such information is then provided to a user of the machine recovering the sheets. Alternatively, such analysis may be conducted by transferring data away from the machine along with the suspect sheets, and conducting the analysis at another validator. Of course these approaches are exemplary of approaches that may be used to uniquely identify a suspect sheet and associate it with a user and/or a transaction.

In the exemplary embodiment of the cash acceptor mechanism 80, it is desirable to maintain the interior components of the cash acceptor mechanism isolated and in sealed relation except when access is required for servicing. As can be appreciated, while the exemplary embodiment positions the cash acceptor mechanism in intermediate relation between a vertically extending wall of the generally L-shaped chest and the wall of the housing to provide enhanced security, it also presents challenges for servicing. While the ability of the exemplary embodiment to move the cash acceptor mechanism rearward through a service opening of the ATM facilitates servicing, problems are still potentially presented by the need to have to remove cover panels and the like. Further, there is always a risk that cover panels, once removed, will not be replaced resulting in infiltration of contaminants to the cash acceptor mechanism and causing malfunctions or failures.

Figure 15:
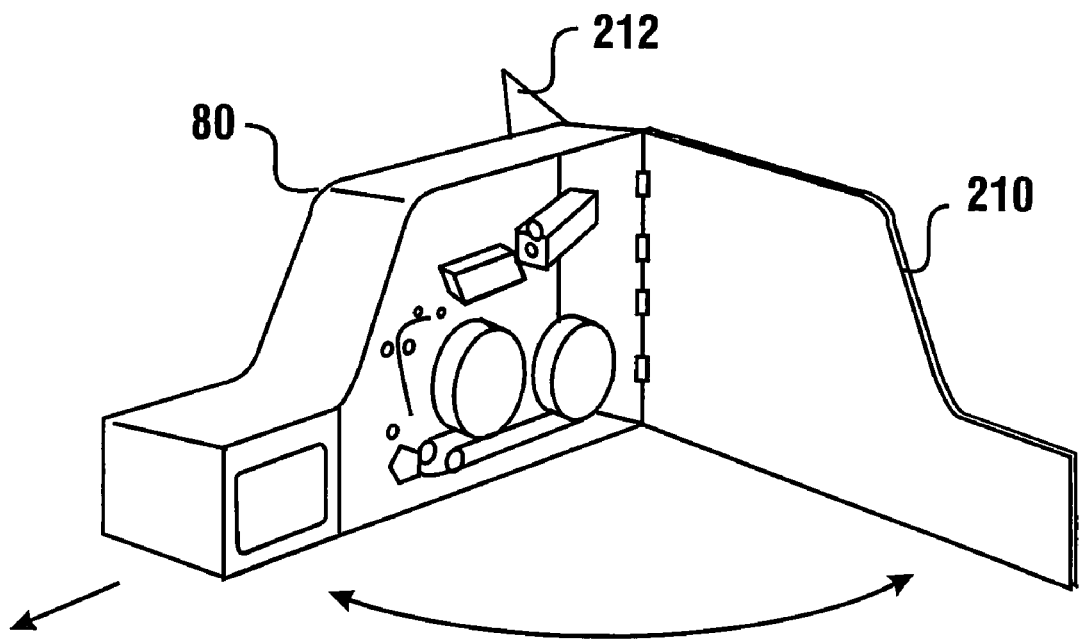
FIG. 15 is a schematic view of the cash acceptor mechanism with a first form of service panel shown in an open position for purposes of servicing.

To reduce the risk of service persons not replacing service panels, the exemplary embodiments of the invention are made to minimize the risk that service panels will be removed and not replaced. As shown in FIG. 15, in one exemplary embodiment a side service panel 210 is mounted in hinged relation in supporting connection with the cash acceptor mechanism. This enables the service panel 210 to be opened once the cash acceptor mechanism has been moved rearward from the machine. This enables ready access to the components within the machine. In addition in this exemplary embodiment, the front service panel 212 is mounted in hinged relation adjacent the front of the cash acceptor mechanism. This front service panel enables access to components accessible through a front opening of the cash accepting mechanism.

As can be appreciated because of the hinged character of service panels 210 and 212, the panels may be readily opened. However, the hinged mounting makes it difficult for a technician to entirely remove the panels from the machine. Further the cash acceptor mechanism cannot be returned to service without closing the service panels. Of course as can be appreciated, suitable latching mechanisms or other holding devices may be used so as to assure that once the service panels are returned to their closed position, they remain therein until such time as the service panels need to be opened again for servicing.

Figure 16:
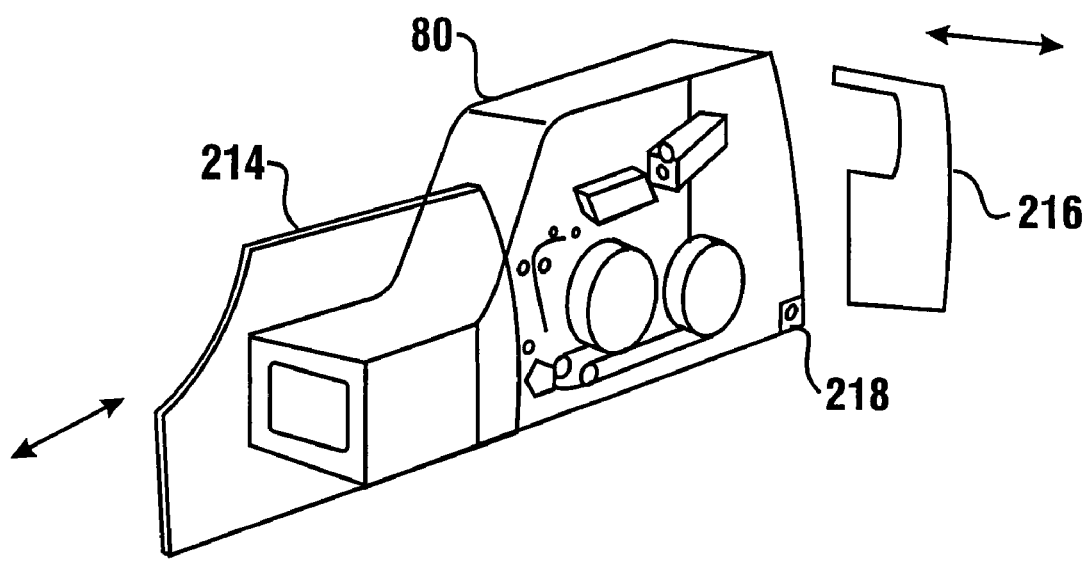
FIG. 16 is a view of the cash acceptor mechanism similar to FIG. 15 but with an alternative form of service panels shown in an accessible position.

FIG. 16 shows yet a further schematic view of an alternative approach to providing service panels on the cash acceptor mechanism 80 that provide protection for internal components and yet can be readily removed for servicing. In the embodiment shown in FIG. 16, service panels 214 and 216 are provided such that they can move in the direction indicated by the adjacent arrows. Service panels 214 and 216 in the exemplary embodiment are mounted in channels, slots or other suitable devices on the cash acceptor mechanism for guiding and holding the panels in position. The useful aspect of the service panels shown in FIG. 16 is that the cash acceptor mechanism 80 need not be removed from the operative position in order to open the interior of the mechanism by moving the service panel. Indeed in the exemplary embodiment, service panel 214 may be entirely removed exposing the components of the cash acceptor mechanism without moving the cash acceptor mechanism from the operative position. Service panel 216 which may include the front face supporting the resilient gasket, may be made more readily removable by moving the gasket relative to the chute. The ability to remove service panels may be particularly useful in situations where a service person needs to observe the cash acceptor mechanism in operation in order to diagnose and remedy certain problems.

In some embodiments it may be desirable to include devices to assure that the service panels 214 and 216 are reinstalled on the cash acceptor mechanism after servicing procedures are completed. This may be accomplished by including contact switches such as the contact switch schematically represented as 218 to sense when the service panels have been placed back in position. Such contact switches may limit the operation of the cash acceptor mechanism until such panels are replaced. Alternatively the circuitry within the ATM may cause an alarm or other indication to be given or may disable operation of the currency acceptor mechanism if the access doors to the upper housing are closed and the service panels have not been returned to their operative position. Of course other approaches may be used.

As can be appreciated, the arrangements of service panels shown in FIGS. 15 and 16 for the cash acceptor mechanism are exemplary and in other embodiments other approaches may be used.

In the exemplary ATM 10 there is also included a mechanism for dispensing cash through the cash dispensing opening 38 in the fascia. This cash dispensing mechanism generally indicated 220 is schematically represented in FIG. 3. In the exemplary embodiment the cash dispensing mechanism is positioned in the higher side of the generally L-shaped chest and includes a plurality of note storage areas 222, 224, 226, 228, 230 and 232. In some exemplary embodiments the note storage areas may be housed within removable currency cassettes which are suitable for holding notes and which may be readily removed from the machine.

In the exemplary embodiment each of the note storage areas is in operative connection with a picker mechanism 234, 236, 238, 240, 242 and 244. Each of these picker mechanisms are selectively operative responsive to controller 64 to selectively dispense notes or other sheets from the corresponding storage area responsive to appropriate inputs to input devices of the user interface. In some exemplary embodiments the picker mechanisms used may be similar to the picker mechanism 86 used to separate sheets from a stack in the cash acceptor mechanism 80.

In the exemplary embodiment a vertically extending transport 246 is in operative connection with the picker mechanisms and a presenter mechanism 248. In operation of the machine the presenter mechanism is operative to receive sheets dispensed by the picker mechanisms and to move the sheets upward through the transport 246 to accumulate the sheets into a stack schematically indicated 250. After the desired sheets have been accumulated, the presenter mechanism is operative to move the stack toward the cash dispensing opening 38 while the controller is operative to open the cash dispensing gate 42. This enables the stack of sheets to be dispensed to a user of the machine.

It should be understood that while in the exemplary embodiment the cash dispensing mechanism 220 has been described as dispensing various denominations of currency notes, in other embodiments the cash dispensing mechanism may dispense other types of sheets. These may include, for example, travelers checks, stamps, vouchers, scrip, gift certificates, or other documents. Further, in some embodiments the ATM may be operative to dispense combinations of both notes and other documents as may be requested by the user. Of course the mechanisms shown are exemplary and in other embodiments other approaches may be used.

In operation of the exemplary ATM 10, a user operating the machine provides inputs sufficient to identify the user's account through the input devices of the machine. This may include, for example, providing a card and/or alpha-numeric data through the input devices which can be correlated through operation of the controller in the machine and/or by interaction with a remote computer to determine a financial account of the user. The controller thereafter operates the output devices of the machine so as to prompt the user to provide inputs and to select a particular type of transaction or provide other inputs. In situations where the user wishes to conduct a cash accepting transaction, the ATM operates responsive to the controller 64 to open the gate 44 to the chute 82 which enables the user to provide a stack of notes or other documents into the machine.

In response to the user providing the stack of documents 84 and/or in response to inputs from the user, the cash acceptor mechanism 80 operates to unstack the documents through operation of the picker mechanism 86 and to determine at least one of the characteristics of each document through operation of the validator device 88. The determined characteristics of the documents may cause valid or acceptable documents to be routed through operation of the routing device 92 into the escrow device 94 where they may be temporarily stored. Also, the controller may operate the routing device 92 to direct suspect documents such as invalid documents or probable counterfeit notes to the transport 86 and the storage area 100.

In the exemplary embodiment once the documents have been moved past the validator, the controller may operate to advise the user of the machine's determination with regard to the documents through outputs through one or more output devices. In some exemplary embodiments the user may be offered the option to recover the valid or invalid documents or both. This may be accomplished by the escrow device delivering the documents to the same or different transports such that the documents may be returned to the chute or other area of the machine that is accessible to the user. Likewise if the option is offered, invalid documents may likewise be routed back to the user. Of course various approaches may be used depending on the particular machine configuration and the programming associated with the controller.

In the exemplary transaction, if the documents determined to be valid are to be stored within the machine, the controller operates responsive to inputs from the user and/or its programming to cause the escrow device 94 to deliver the documents. The documents are directed by the routing device 92 through the cash accepting opening 102 in the chest in which they are transported and stored in the appropriate sheet handling mechanisms or in an appropriate bulk storage container. In the exemplary embodiment the user's account is credited for valid sheets deposited. Information is collected concerning any invalid sheets provided by the user so that if the sheets are later determined to be valid, the user may be credited or alternatively the user may be contacted to determine the source of the invalid sheets. Of course as can be appreciated, this transaction is exemplary and in other embodiments other approaches may be used.

Using the exemplary ATM 10 a user may also conduct cash dispensing transactions. This may be done either during the same session as a cash accepting transaction or as part of a separate session. In such a transaction the user of the ATM provides inputs to the input devices that are sufficient to identify one or more accounts of the user and/or other identifying inputs. Responsive to prompts through the output devices, the user provides inputs indicating that they wish to conduct a transaction involving the dispense of notes or other types of sheets, and the amount, nature or character of the sheets that the user has requested.

Responsive to the inputs from the user the controller 64 is operative to cause the cash dispenser mechanism 220 and the picker mechanisms located therein to deliver the requested sheets to the presenter mechanism 248, which is operative to accumulate the requested sheets into a stack 250. Once the sheets are accumulated, the sheets are moved outward to the user as the gate mechanism is opened. Hereafter the controller operates to cause the value of the dispensed cash or other sheets to be charged to the user's account.

It should be understood that the transactions described are exemplary and additional types of transactions may be carried out through operation of various embodiments. In addition as previously discussed, mechanisms that are operative to both accept and dispense cash such as those described in the incorporated disclosures may be utilized as substitutes for, or in addition to, the mechanisms described herein so as to carry out transactions. Other types of transaction function devices may be included in some embodiments. For example as previously discussed, embodiments of the invention may be operative to image and validate checks. In such cases it may be desirable for the machine to have the capability to cancel the check or destroy the check so there is no risk that the check may be later be stolen and used fraudulently. In some embodiments suitable mechanisms may be provided for carrying out such functions. In addition it may be desirable in some embodiments to have the machine produce bank checks, travelers checks, tickets or other documents and suitable mechanisms may be provided for producing such documents in the selected amounts. Further, in alternative embodiments features used by merchants such as devices for accepting deposit bags, dispensing rolled coin and other devices may be incorporated into an ATM or other automated banking machine having features described herein. As can also be appreciated, features of the exemplary ATM may also be used in numerous other types of automated banking machines.

Exemplary embodiments of the invention include light emitting devices 17, 31, 41, 43 and 45. In the exemplary embodiment the light emitting devices are positioned in areas on the user interface at locations associated with particular transaction function devices. For example, light emitting device 31 is associated with the receipt printer 30 and light emitting device 17 is associated with the card reader 16. In the exemplary embodiment the light emitting devices are in operative connection with the one or more controllers in the machine. In addition, such devices are capable of emitting light of selected colors at particular times during the transaction responsive to the operative condition of the transaction function device of the ATM with which the light emitting device is associated.

In the exemplary embodiment the light emitting devices include an array of LEDs of different colors embedded on a flexible circuit. For example, FIG. 22 represents light emitting device 31. However, it should be understood that in the exemplary embodiment all the light emitting devices are generally similar. Light emitting device 31 includes an array of LEDs 304 connected through a circuit on a flexible substrate such as a polymide film, for example, DuPont Kapton® material, and includes a flexible connector portion 306. The flexible connector terminates in an electrical connector 308. Electrical connector 308 is releasably connectible to a driving circuit or other electrical circuit in the machine which operably connects to one or more controllers for purposes of controlling the illumination of the light emitting device.

As shown in FIG. 23, in the exemplary embodiment the light emitting device includes three different color LEDs. These LEDs are red, green and yellow, which are represented by "R," "G," and "Y" in the figures as shown. As represented in FIG. 23, in the exemplary embodiment the LEDs are in an array such that LEDs of only one color are vertically aligned along a single line of the light emitting device. For example, as shown in FIG. 23, a line 310 comprises a line of vertically aligned red LEDs. As shown in FIG. 23, a line 312 is a line of only green LEDs, and a line 314 of only yellow LEDs. As shown in FIG. 23, in the exemplary embodiment the lines repeat so that there are five vertical lines of each color LED. It should be understood that while in the exemplary embodiment the LEDs of each color are arranged in vertically aligned relation, in other embodiments other arrangements such as horizontal alignment or other matrices of LEDs may be used. It should also be appreciated that although the LEDs are connected electrically in series as shown in FIG. 24, the electrical connections on the flexible circuit provide for spaced vertically aligned pairs of LEDs of only one color.

As shown in FIG. 25, in the exemplary embodiment the light emitting devices are supported in a flexible web. The web is thin in the preferred embodiment, having a thickness of approximately 1.20 millimeters. This facilitates the positioning of the light emitting devices on the user interface. In the exemplary embodiment, LEDs which are represented 316 and 318 are mounted on a base layer 320 including the circuit on a flexible substrate. An outer layer 322 which in the exemplary embodiment comprises a polyester layer overlies the LEDs. A spacer 324 extends between the base layer and the outer layer. As best shown in FIG. 23 multiple spacers may be used. In the exemplary embodiment the spacers are positioned outboard of the LEDs and include openings 326 to facilitate positioning the light emitting devices on the machine. This may include, for example, extending pins, studs, or fastening devices through the openings so as to secure the light emitting devices in the proper position. Further, in the exemplary embodiment the release layer includes an underlying adhesive layer 328. The adhesive layer enables attaching of a light emitting device to a selected area within the machine. The adhesive layer is initially exposed for purposes of attaching the light emitting device by removal of an adhesive release layer 330 as shown in FIG. 25.

In an exemplary embodiment the light emitting devices are attached to components of the machine with which they are associated. This may be done, for example, by using modular construction for the transaction function devices within the machine and attaching the particular light emitting device to the associated module. For example, FIG. 18 shows the cash accepting device 80 which is arranged as a modular device for purposes of processing sheets that may be received in the machine. In the exemplary embodiment the associated light emitting device 41 is mounted in supporting connection with the module. The adjacent fascia area of the machine provides an opening through which the light emitting device may be viewed when it is in the operative position. In some embodiments the fascia of the machine may include a transparent or translucent material separating the light emitting device from the exterior of the machine. However in other embodiments the light emitting devices may be exposed on the exterior of the machine. The attachment of the light emitting devices directly to the modular components of the machine may facilitate assembly and service of the machine. Placing the light emitting device directly on the module of the transaction function device with which it is associated, may reduce the amount of wiring and connectors needed for purposes of assembly and service.

In the exemplary embodiment the multicolor light emitting devices are operated under the control of one or more controllers in the machine. Each light emitting device is operated to emit light of a selected color and/or in a selected manner responsive to the operative condition of an associated transaction function device. For example, exemplary machines may be selectively programmable to emit a particular color light responsive to a given operative condition. For example, the light emitting device adjacent to the card reader may emit green light when it is ready to receive the card of a user, and then change to a yellow light after the card has been received therein. Alternatively or in addition, lights of a different color may flash or alternate to reflect conditions of a particular device. Further, for example, in the event of an improper action such as a user attempting to insert a card into the card reader incorrectly, the controller may be programmed to have the associated light emitting device emit red light or otherwise flash a color of light so as to indicate to the user that they have done something improper. Similarly, if a particular transaction function device is malfunctioning or not available, red light may be output.

In some exemplary embodiments the controller may be programmed so as to illuminate the light emitting devices to guide a user in operation of the machine. This may include, for example, illuminating or flashing a particular colored light to indicate a required user activity at a particular location on the machine. For example, at a particular time in the transaction the controller may cause to be output on the display an indication to the customer that they are to take their receipt. When the machine has delivered the receipt, the controller may operate to cause the light emitting device 31 associated with the receipt delivery to illuminate, flash or otherwise indicate to the user that activity is required by the user in the area of the receipt delivery slot.

In some exemplary embodiments the controller may be programmed to cause the light emitting devices to selectively illuminate intermittently and for a different duration depending on the operative condition of an associated device. For example, if a user provides inputs so as to request a cash-dispensing transaction, the light emitting device 43 adjacent to the cash dispensing opening may illuminate in a yellow condition as the machine operates internally to move bills toward the cash dispensing opening. Thereafter as the bills are pushed through the opening and presented to the user, the controller may cause the color of the light emitting device to change to green. In addition, the controller may cause the green light to flash so as to draw the user's attention to the fact that the money is ready to be taken. Further, in an exemplary embodiment, if the user has not taken their cash after a certain time and the machine is programmed to retract it, the controller may cause the light emitting device to flash, change the frequency and/or duration of flashing or may operate so as to flash different colors in an alternating fashion so as to capture the attention of the user prior to the money being retracted.

In other embodiments, the colors emitted by the light emitting devices may be selectively programmed based on aesthetic reasons. For example, if the entity which operates the machine has particular trade dress involving certain colors the controller may be programmed to have the light emitting devices correspond with that trade dress. Thus, for example, if the particular entity's trade dress color is green, the machine may be programmed to utilize the green LEDs as lead-through indicators in prompting the user in how to operate the machine. Likewise if a different operating entity with a similar machine utilizes yellow as part of their trade dress scheme, the controller may be programmed to illuminate the yellow LEDs in the light emitting devices as the lead-through indicators.

It should further be understood that although the use of three color of light emitting devices is shown, this is exemplary and in other embodiments additional types of light emitting devices may be provided. In addition it should be understood that although light emitting devices in the exemplary embodiment are arranged so that only one color may be output from a given light emitting device at a given time, in other embodiments provision may be made to illuminate multiple color LEDs simultaneously. In such arrangements, LEDs in primary colors may be included so as to achieve ranges of hue through color combinations. This may be done by illuminating multiple light emitting sources simultaneously and/or varying the intensity of such sources through operation of a controller so as to achieve various colors. This may include, for example, providing for a gradual change in the hue of the light emitting device in accordance with the status of the associated transaction function device. This may include, for example, providing an indication to the user of the status of the completion of a particular task. Combinations of two or more colors may also be selectively produced. It should also be understood that although LEDs are used as the light source in the exemplary embodiment, in other embodiments of the invention other approaches may be used. It should be understood that the structures and operations described are exemplary and numerous other structures and methods may be encompassed within the scope of the present invention.

Figure 26:
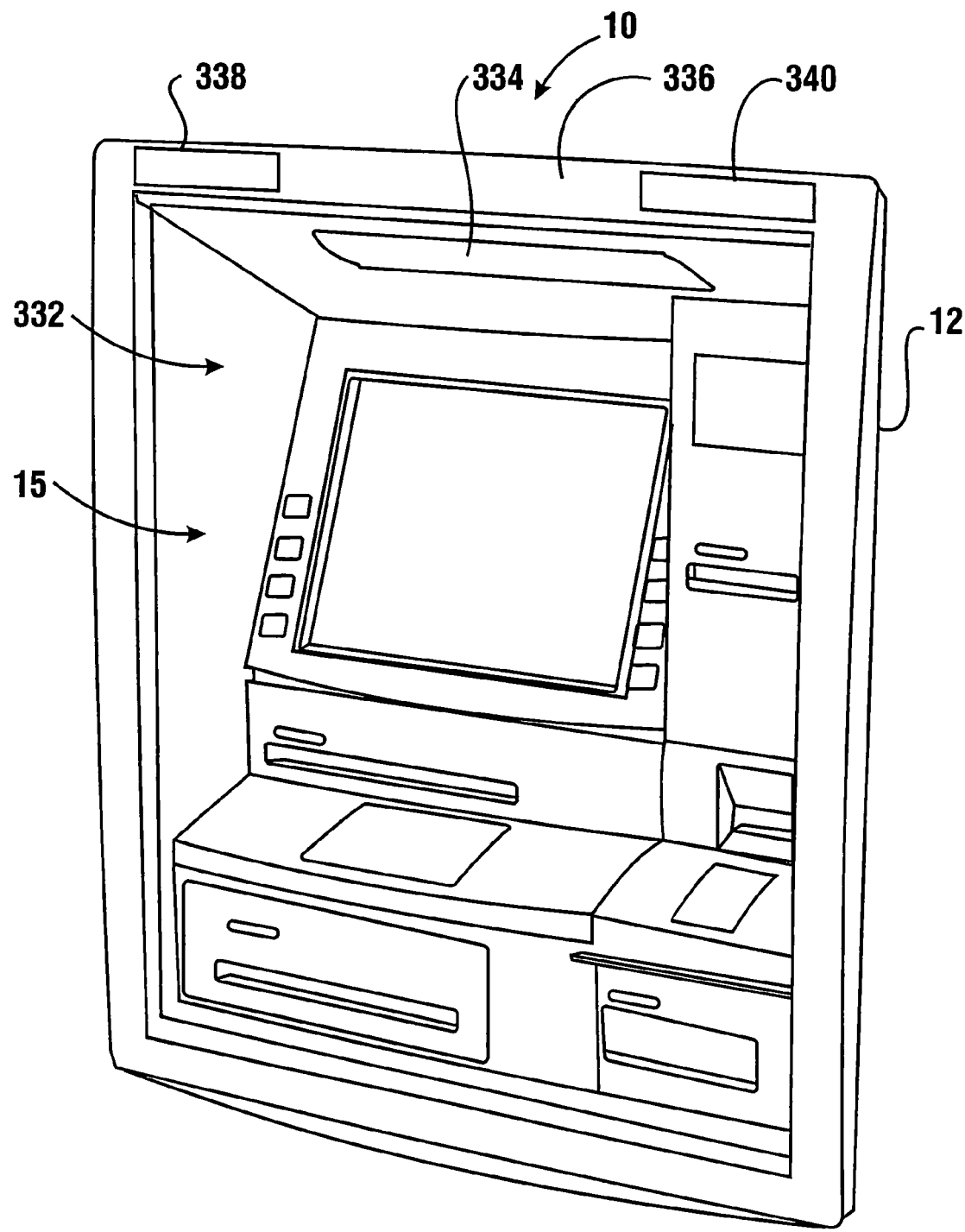
FIG. 26 is an isometric view of the fascia shown in FIG. 1 and particularly the mirrors thereon which facilitate a user viewing the area adjacent to them when operating the machine.

In the exemplary embodiment of ATM 10, provision is made to facilitate a user's operation of the machine and to minimize the risk of persons improperly observing a user or their activities. Such undesirable activities may include, for example, unauthorized persons observing the user's input of their PIN number or other data. As shown in FIG. 26, fascia 12 of the exemplary embodiment includes a recessed area 332 in which the display, function keys, card reader and receipt outlet are positioned. This recessed area 332 is illuminated by a light source 334. Light source 334 provides illumination generally in the downward direction so as to enable the user to more readily view the locations of the input and output devices on the fascia of the machine.

In the exemplary embodiment the fascia 12 includes a top panel portion 336 which is positioned generally above the light source 334 and the user interface of the machine. As represented in FIG. 26, the top panel portion includes a pair of convex mirrors 338, 340. The convex mirrors 338, 340 are generally horizontally disposed and are positioned at opposed sides of the user interface.

Figure 27:
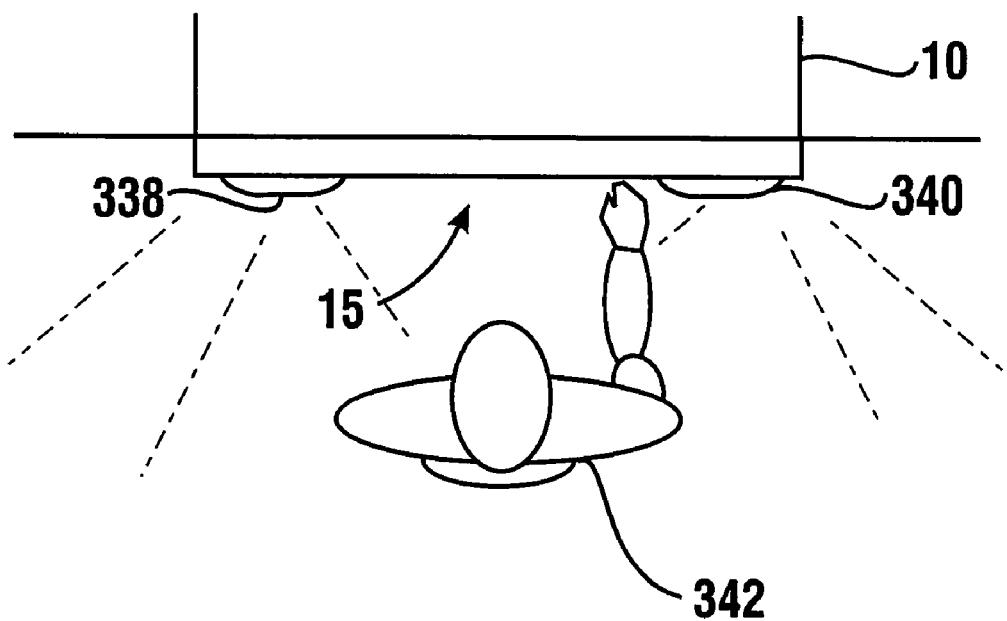
FIG. 27 is a schematic top view indicating the area viewable by a user operating the machine.

As represented in FIG. 27, a user 342 operating the ATM 10 will generally have their body aligned with the user interface 15 of the machine. As a result, the user is generally enabled to view in the convex mirrors an area behind the user generally indicated 343. The user is enabled to do this by looking in the mirrors 338 and 340 to the user's left and right, respectively. By looking in these mirrors, the user is enabled to generally see what is going on behind them as well as in a transverse direction from the area directly behind the user. This may enable the user to determine if one or more persons are in their proximity as well as whether such persons may be attempting to observe the user or their inputs to the ATM. In some embodiments where the ATM is operated in an external environment, lighting sources may be provided in the area 343 to facilitate the user's observation of persons who may be present therein.

It should be understood that the arrangement shown is exemplary and in other embodiments other mirror or observation arrangements may be used. In addition, in some embodiments provision may be made to maintain the cleanliness of the mirrors so as to reduce the risk that the user's ability to observe surrounding activities is impaired. These provisions may include, for example, automated devices which wipe the surface of the mirrors periodically. These may be external wiping devices or in some embodiments internal wiping devices. This may be accomplished, for example, by having the convex mirrors be in supporting connection with one or more rotatable members that may be periodically rotated within the fascia by a motor or other moving device that operates responsive to the ATM controller so as to expose a new external surface. Cleaning devices on the interior of the fascia may operate to wipe contaminants from the surface of the mirror as it passes internally such that further rotation exposes a clean mirror surface to the user. This may include for example contact wiper blades that engage the surface of the mirror. Movement of the mirror surface such as rotation thereof in engagement with the wiper blades may serve to remove accumulations of dirt on the reflective surface. In some embodiments the mirror surface may be part of a cylindrical body, and rotation of the body about a central longitudinal axis may provide wiping action as the mirror surface moves past stationary wipers engaged therewith. In some embodiments the stationary wipers may be comprised of resilient material and/or may include movable mounting mechanisms so as to bias the wiper into engagement with the movable mirror surface. In alternative embodiments a reservoir of cleaning solution may be provided within or adjacent to the machine. A suitable pump or other device may be used to apply the cleaning solution to the mirror surface as it is moved relative to the wipers so as to facilitate the removal of dirt therefrom. Of course these approaches are merely exemplary and in other embodiments other approaches may be used.

In some embodiments the buildup of material on the mirror surface may be detected to determine when there is a need for cleaning. This may be done for example by providing a mirror that has some significant light transmission properties as well as light reflective properties in the manner of a half silvered mirror. For example a radiation source and sensor may be positioned behind the mirror. In such embodiments radiation emitted by the radiation source is partially reflected from the interior of the mirror surface and the magnitude of the reflected radiation is sensed by the sensor. A buildup of dirt on the outer surface of the mirror changes the amount of radiation reflected from the internal radiation source to the sensor. In some exemplary embodiments the buildup of dirt on the exterior mirror surface increases the magnitude of radiation reflected from the internal mirror surface. This change in the magnitude of reflected radiation is detected and used as the basis for determining a need for cleaning the mirror. For example immediately after cleaning the mirror the ATM controller or other processor may cause the emitter to output radiation and the sensor to sense the magnitude of internally reflected radiation from an internal surface of the mirror. This initial value is stored by the controller in one or more data stores. Thereafter on a periodic basis, for example on a timed basis or after each or a set number of transactions, the emitter may again output radiation and the level of reflected radiation sensed. The controller may then compare the then current level of reflected radiation to the initial value.

In response to sensing a difference greater than the set amount, which difference corresponds to an unacceptable level of dirt built up on an exterior surface of the mirror, the controller operates to provide one or more signals. The signals result in the mirrors being cleaned. Such signals may include for example operating a device such as a motor or other mechanism so as to cause movement of the mirror to undergo cleaning. Alternatively in some embodiments the controller may cause a message to be sent to a remote servicer indicating a need for cleaning of the mirror surfaces on the fascia. In still other embodiments the controller may cause the ATM to operate to try to clean the mirrors through the ATM's internal cleaning mechanism and then test the reflectance again after the attempted self cleaning. If the self cleaning effort does not cause the reflectance value to reach the prior initial value or within a programmed range (indicating perhaps that the mirror has been spray painted) the controller is operative to cause a message to be set to contact a remote servicer. Of course these approaches are merely exemplary and in other embodiments other approaches may be used.

In some other alternative embodiments the controller may sense for dirt on a mirror through the use of mirrors or other reflective devices that pass at least some significant amount of light therethrough from the exterior to the interior. One or more light sensors in operative connection with the machine controller are positioned behind the mirror surface. An external light sensor is positioned on the exterior of the ATM to sense the level of ambient light. A controller is programmed to determine an unacceptable level of accumulation of dirt on the mirror based on the level of external ambient light that is sensed as passing through the mirror. This may be done for example by sensing the magnitude of the signal from the ambient light sensor and comparing the magnitude of ambient light to the magnitude of light sensed as reaching the sensor located behind the mirror. As can be appreciated when little or no dirt is accumulated on the mirror surface, the greatest amount of light will reach the sensor behind the mirror. As dirt accumulates the level of light transmitted will decrease. If the magnitude of the light sensed as passing through the mirror and reaching the sensor relative to the level of ambient light declines to a preset ratio or other value, the controller may then operate in accordance with its programmed instructions to operate the necessary device to self clean the mirror, generate signals so as to contact a servicer, or take other appropriate action.

In further alternative embodiments one or more external ambient light sensors may be in operative connection with the controller, and an internal emitter and sensor behind a mirror surface that enables light to pass therethrough may also be used. In such embodiments the controller may be programmed to analyze the amount of ambient light that is expected to pass through the mirror and reach the sensor based on the ambient light level. In such circumstances the controller can compensate for the ambient light when sensing the level of reflected light from the internal emitter. Such compensation may further help more accurately detect when there is a need for the mirror to be cleaned. Of course the particular relationships and compensation levels will depend on the particular mirror configuration. Alternatively or in addition in some exemplary embodiments, the controller may operate so as to sense the level of ambient radiation and the magnitude thereof that passes through the mirror to reach the sensor at a different time than when the controller operates the internal emitter and senses reflected radiation. The controller may be operative to compare these two separate values and the relationship thereof and/or changes in reflectance and light transmissivity over time so as to determine when the mirror needs to be cleaned. Of course these approaches are merely exemplary and in other embodiments other approaches may be used.

In still other embodiments the mirrors may be operative only during transactions or portions thereof. This may be done for example by providing mirrors that are operative only when a person is sensed as adjacent the machine or the machine is involved in conducting a particular portion of a transaction. For example a sensor such as a sonic sensor, radiation sensor, weight sensor or other suitable device may detect a user in proximity to the machine. Upon sensing the user adjacent the machine the controller may be operative to cause one or more mirrors to be exposed externally on the fascia of the machine. This may be done for example by having movable members in supporting connection with the mirror surfaces driven by motors or other suitable moving devices that are in operative connection with the controllers. Upon sensing a user adjacent the machine the controller is operative to cause the motors or other moving devices to cause the mirrors to move into an operative position so a user can view the area behind them.

For example in some embodiments the reflective surfaces which comprise the mirror may be in supporting connection with a rotatable member. The rotatable member may be rotated when the customer is present at the machine so that the reflective surface is positioned so as to provide the user with a view of the area behind them. Further when the customer is sensed as leaving the area of the ATM, such departure of the user is sensed and the controller in response thereto is operative to cause the members that include the reflected surfaces to move so that the reflector surfaces are no longer exposed. Such an approach may provide an advantage in that the mirror surfaces are exposed to the elements only during the times when transactions are occurring and therefore are less likely to accumulate dirt as quickly. In addition in some embodiments wipers or other suitable cleaning devices may be provided adjacent to the reflective surfaces so that as the reflective surfaces move the surfaces are wiped and cleaned so as to remain relatively dirt free.

Although in some embodiments the reflective surfaces may move into the operative position for a customer responsive to sensing a user adjacent to the machine, in other embodiments other approaches may be used. These may include for example moving the mirror surfaces to the operative position only in response to certain actions or certain transaction types being conducted by the user at the machine. Alternatively or in addition the mirrors may be moved to the operative position only in response to other conditions such as ambient lighting conditions, the time of day and/or the sensing of persons or objects entering an area behind the user in which persons or objects are sensed. Alternatively or in addition the controller may be programmed and appropriate sensors may be provided to move the mirrors to the operative position based on the nature of the use being made by the user of the ATM. For example in an ATM that is intended for both drive up and walk up use, appropriate sensors may be positioned so as to sense whether the user is positioned in a vehicle or has approached the machine on foot. This may be done for example through proximity sensors, magnetic sensors, weight sensors or other suitable sensors. The controller may be programmed to make a determination based on one or more sensor inputs whether the user is in a vehicle or is on foot. In situations where the user is determined to be in a vehicle the deployment of the mirrors to the operative position may be deemed unnecessary because the vehicle may serve to block access by unauthorized users to viewing the inputs that the user makes to the machine. Alternatively if the user is determined to have approached the machine on foot, the controller may be operative to deploy the mirrors to the operative position so as to assure that the user can view the area behind them in which unauthorized persons may be attempting to view inputs to the machine.

In still other embodiments alternative or additional provisions may be made to further help to prevent the observation of inputs by users to the machine. For example in some embodiments the machine fascia may be provided with lighting that is directed rearward from the fascia outside of the line of sight of the user. Such rearward directed lighting, when activated, may operate to obscure the view of unauthorized persons or devices attempting to observe inputs by the user to a machine. Such rearward directed lighting may be selectively operative when a user is sensed as adjacent to the machine so as to reduce the risk of the interception of the user inputs and/or to provide lighting in the area behind the user. In other embodiments the controller may be programmed so as to be operative to initiate the rearward directed lighting only during certain portions of the transaction where the user is conducting certain activities. For example the controller may be programmed so as to activate the lighting when the user is providing an input of a PIN number which unauthorized persons may wish to intercept. Further in some embodiments the rearward directed lighting may be activated only at those times that the mirrors are moved into the activated position. Alternatively or in addition the lighting devices may be mounted in supporting connection with the mechanisms associated with the mirror structures. Further provision may be made in some cases so as to provide mechanisms for cleaning the lighting devices as they are moved into the operative position. Of course these approaches are exemplary and in other embodiments other approaches may be used. Further, the principles discussed may be used with other types of automated banking machines and in other circumstances other than those described in connection with the exemplary embodiment.

Thus the automated banking machine and system of the exemplary embodiments may achieve one or more of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A method comprising:
   (a) operating a picker member drive device of a currency note picker arrangement to drive at least one picker member in a direction opposite a note picking direction; and
   (b) operating a stripper member drive device of the currency note picker arrangement to drive at least one stripper member in a note stripping direction, wherein the stripper drive device is operable independently from the picker drive device.

2. The method according to claim 1 wherein the at least one picker member comprises at least one picker roller, wherein step (a) includes driving the at least one picker roller,
   wherein the at least one stripper member comprises at least one stripper roller, wherein step (b) includes driving the at least one stripper roller.

3. The method according to claim 1 wherein steps (a) and (b) are carried out simultaneously while the stripper member drive device operates independently of the picker member drive device.

4. The method according to claim 3 wherein steps (a) and (b) are carried out simultaneously to cause simultaneous movement of overlapping currency notes in a reverse direction.

5. The method according to claim 4 and further comprising
   (c) prior to step (a), operating the picker member drive device during a currency note picking operation to drive the at least one picker member in the note picking direction.

6. The method according to claim 5 wherein step (a) includes simultaneously moving the overlapping currency notes in a forward direction that is opposite the reverse direction.

7. Apparatus comprising:
   a currency note picker arrangement operative to pick currency notes,
      wherein the arrangement includes at least one picker member and at least one stripper member,
      wherein the arrangement includes a picker member drive device,
         wherein the picker member drive device is operative to drive the at least one picker member in a note picking direction,
         wherein the picker member drive device is operative to drive the at least one picker member in a reverse direction, wherein the reverse direction is opposite the note picking direction,
      wherein the arrangement includes a stripper member drive device,
         wherein the stripper member drive device is operative to drive the at least one stripper member in a note stripping direction,
      wherein the arrangement includes a controller,
         wherein the controller is operative to control the picker member drive device,
         wherein the controller is operative to control the stripper member drive device,
         wherein the controller is operative to control the stripper member drive device independently of the picker member drive device.

8. The apparatus according to claim 7 wherein the controller is operative to cause the at least one picker member to move in the reverse direction while the at least one stripper member moves in the note stripping direction during a currency note picking operation.

9. The apparatus according to claim 8 wherein the arrangement includes at least one sensor, wherein the at least one sensor is operative to detect overlapping currency notes.

10. The apparatus according to claim 9
    wherein movement of the at least one picker member in the note picking direction is operative to cause at least one note to move in a forward direction,
    wherein the controller is operative to cause detected overlapping currency notes to be simultaneously moved in a direction generally opposite the forward direction.

11. The apparatus according to claim 9 wherein the at least one stripper member comprises a first rotatable stripper member and a second rotatable stripper member, wherein the controller is operative to rotate the first rotatable stripper member to cause a first note in detected overlapping currency notes to move relative to a second note in the detected overlapping currency notes.

12. The apparatus according to claim 7 wherein the controller is operative to cause the at least one stripper member to move at higher rate of speed than the at least one picker member.

13. The apparatus according to claim 7 wherein the at least one stripper member comprises a first rotatable stripper member and a second rotatable stripper member, wherein the controller is operative to cause the first rotatable skipper member to rotate relative to the second rotatable stripper member at a different rotational speed.

14. A method comprising:
    (a) moving at least one picker member in a note picking direction to cause simultaneous movement of overlapping currency notes in a forward direction during a note picking operation; and
    (b) subsequent to step (a), simultaneously
       (b1) operating a picker drive device to cause movement of the at least one picker member in a reverse direction, wherein the reverse direction is opposite the note picking direction, and
       (b2) operating a stripper drive device to cause movement of at least one stripper member in a note stripping direction, wherein the stripper drive device differs from the picker drive device,
    to cause simultaneous movement of the overlapping currency notes in a direction generally opposite the forward direction during the note picking operation.

15. The method according to claim 14
    wherein the at least one picker member comprises at least one picker roller, wherein step (b1) includes rotating the at least one picker roller,
    wherein the at least one stripper member comprises at least one stripper roller, wherein step (b2) includes rotating the at least one stripper roller.

16. The method according to claim 15 wherein step (b1) includes rotating the at least one picker roller in a first rotational direction, wherein step (b2) includes rotating the at least one stripper roller in a second rotational direction, wherein the second rotational direction is counter to the first rotational direction.

17. The method according to claim 14 wherein the stripper drive device is operative to drive the at least one stripper member independent of the picker drive device, wherein step (b2) includes operating the stripper drive device independently of the picker drive device to drive the at least one stripper member in the note stripping direction.

18. The method according to claim 14 wherein step (b) includes moving the at least one stripper member at higher rate of speed than the at least one picker member.

19. The method according to claim 14 wherein the at least one stripper member comprises a first rotatable stripper member and a second rotatable stripper member, wherein step (b2) includes rotating the first rotatable stripper member relative to the second rotatable stripper member at a different rotational speed during the note picking operation.

20. The method according to claim 19 wherein the overlapping currency notes comprise a first note and a second note, wherein step (b2) includes rotating the first rotatable stripper member to move the first note relative to the second note.

* * * * *